United States Patent
Ikai

(10) Patent No.: US 10,200,712 B2
(45) Date of Patent: Feb. 5, 2019

(54) MERGE CANDIDATE DERIVATION DEVICE, IMAGE DECODING DEVICE, AND IMAGE CODING DEVICE

(71) Applicant: SHARP KABUSHIKI KAISHA, Osaka-shi, Osaka (JP)

(72) Inventor: Tomohiro Ikai, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 103 days.

(21) Appl. No.: 15/104,420

(22) PCT Filed: Dec. 15, 2014

(86) PCT No.: PCT/JP2014/083169
§ 371 (c)(1),
(2) Date: Jun. 14, 2016

(87) PCT Pub. No.: WO2015/093449
PCT Pub. Date: Jun. 25, 2015

(65) Prior Publication Data
US 2016/0316221 A1    Oct. 27, 2016

(30) Foreign Application Priority Data
Dec. 19, 2013 (JP) ................. 2013-262817

(51) Int. Cl.
*H04N 19/52*    (2014.01)
*H04N 19/597*    (2014.01)

(52) U.S. Cl.
CPC .......... *H04N 19/52* (2014.11); *H04N 19/597* (2014.11)

(58) Field of Classification Search
CPC ....... H04N 19/51; H04N 19/597; H04N 19/52
See application file for complete search history.

(56) References Cited

U.S. PATENT DOCUMENTS

2016/0173904 A1* 6/2016 Park ............... H04N 19/51
375/240.13
2016/0381374 A1* 12/2016 Bang .............. H04N 19/597
375/240.16

(Continued)

OTHER PUBLICATIONS

International Search Report issued in PCT/JP2014/083169 dated Feb. 24, 2015.

(Continued)

*Primary Examiner* — Maria E Vazquez Colon
(74) *Attorney, Agent, or Firm* — Birch, Stewart Kolasch & Birch, LLP

(57) ABSTRACT

Since complexity is high in derivation of an enhancement merge candidate which is a scalable merge candidate, a problem may arise in that a processing amount is large when the enhancement merge candidate is used in a case where a prediction unit in which it is necessary to derive many merge candidates is small. In a merge candidate derivation section including an enhancement merge candidate section that derives a merge candidate referring to an inter-layer picture and a base merge candidate derivation section that derives a merge candidate not referring to an inter-layer picture (referring to the temporary picture or the adjacent block of the same layer), the merge candidate derived from the base merge candidate and the merge candidate derived from the enhancement merge candidate are added to a merge candidate list in a case where the size of a prediction unit is greater than a predetermined size. The merge candidate derived from the base merge candidate is added to the merge candidate list in a case where the size of the prediction unit is equal to or less than the predetermined size.

2 Claims, 27 Drawing Sheets

(56) References Cited

OTHER PUBLICATIONS

Itani et al., "Improvement to AMVP/Merge process, Joint Collaborative Team on Video Coding (JCT-VC) of ITU-T SGJ6 WP3 and ISO/IEC, JTC1/SC29/WG11", JCTVC-E064, pp. 1-8, Mar. 16-23, 2011, 5th Meeting: Geneva, CH.

Tech et al., "3D-HEVC Draft Text 2, Joint Collaborative Team on 3D Video Coding Extension Development of ITU-T SG 16 WP 3 and ISO/IEC JTC 1/SC 29/WG 11", JCT3V-F1001-v2, pp. 1-93, Oct.-Nov. 1, 2013, 6th Metting: Geneva, CH.

Gun Bang et al., 3D-CE3.h related: Simple merge canidate list construction for 3DV, Joint Collaborative Team on 3D Video Coding Extensions of ITU-T SG WP 3 and ISO/IEC JTC 1/SC 29/WG 11. 5th Meeting: Vienna, A T, JCT3V-E0213_r3, pp. 1-5 Jul. 2013.

* cited by examiner

FIG. 2
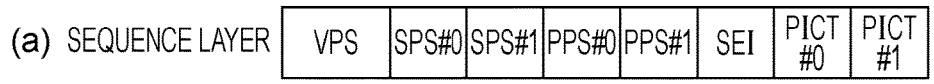
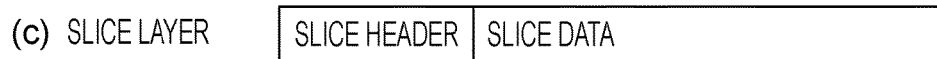
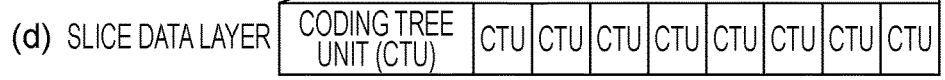
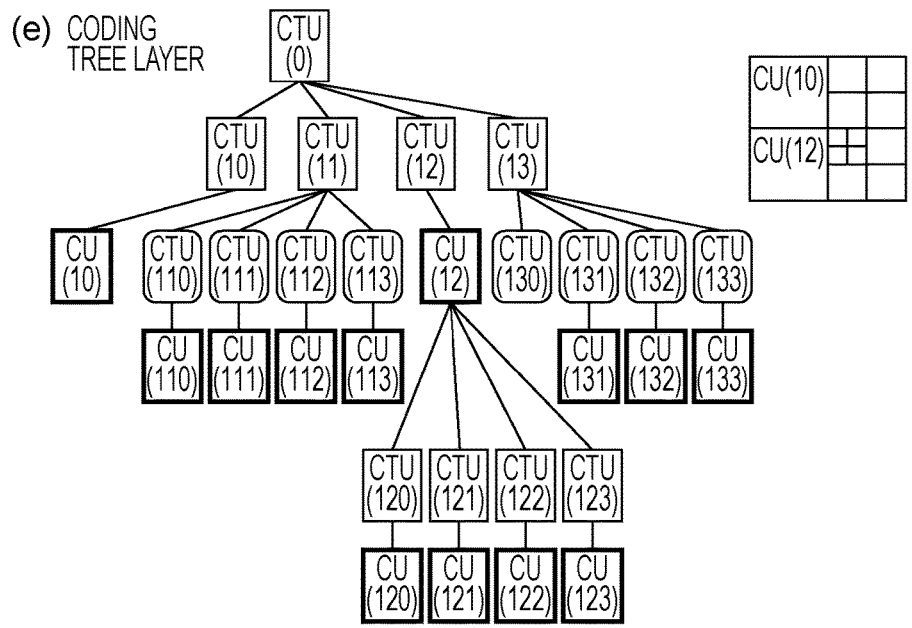
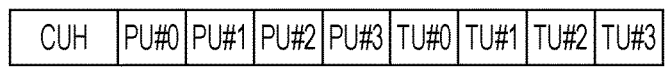

FIG. 12
(a) CASE OF height % 8 ! = 0
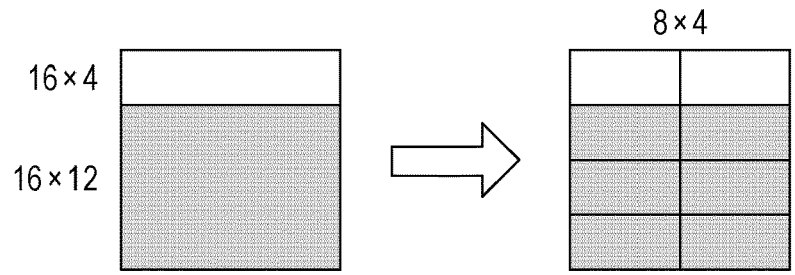
(b) CASE OF width % 8 ! = 0
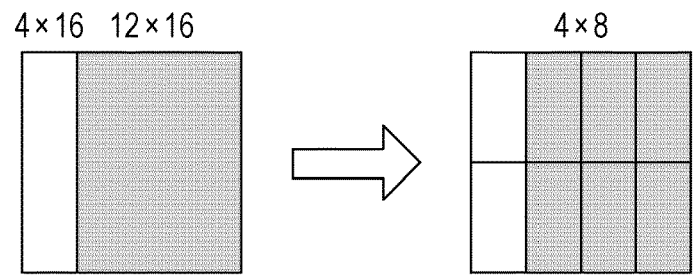
(c) OTHER CASES
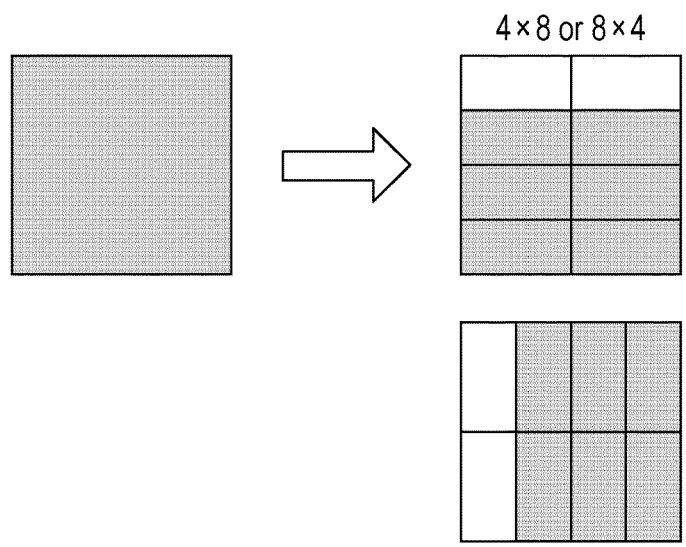

FIG. 18
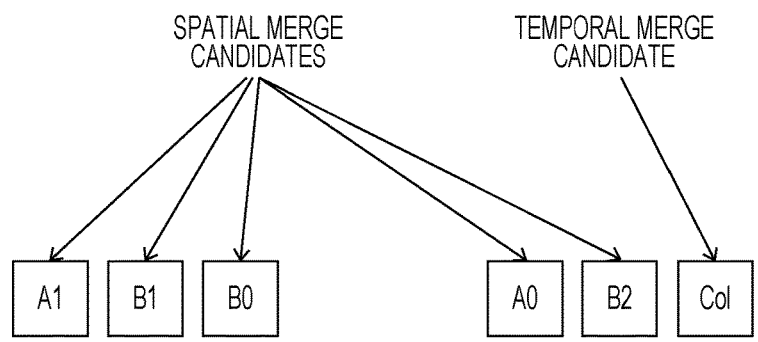
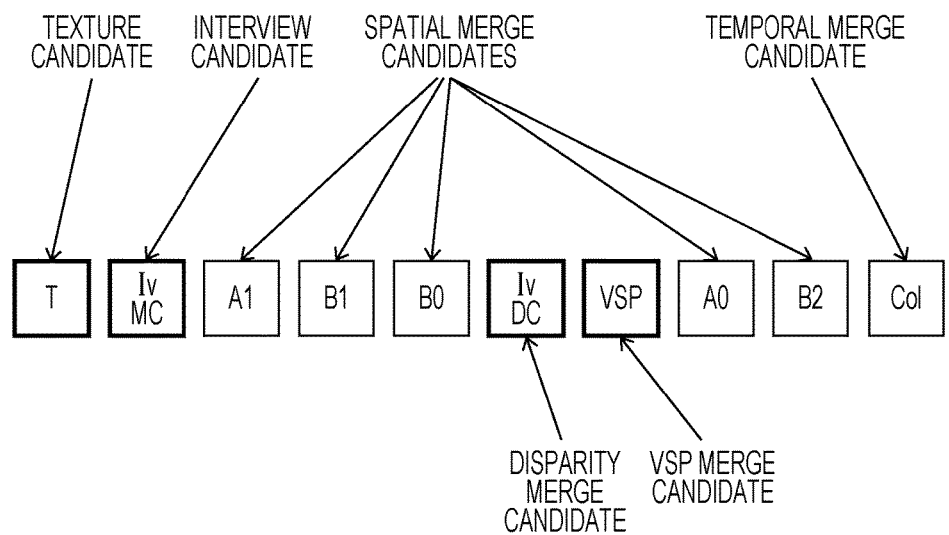

FIG. 23

```
if( availableFlagT && (nPbW + nPbH > 12) )
        extMergeCandList[ i++ ] = T                                      ···S3201 if( availableFlagIvMC && ( !availableFlagT || differentMotion( T, IvMC ) ) && (nPbW + nPbH > 12))
        extMergeCandList[ i++ ] = IvMC                                   ···S3202

N = DepthFlag ? T : IvMC
if( availableFlagA1 && ( !availableFlagN || differentMotion( N, A1 ) ) )
        extMergeCandList[ i++ ] = A1                                     ···S3203 if( availableFlagB1 && ( !availableFlagN || differentMotion( N, B1 ) ) )
        extMergeCandList[ i++ ] = B1                                     ···S3204 if( availableFlagB0 )
        extMergeCandList[ i++ ] = B0                                     ···S3205 if( availableFlagIvDC && ( !availableFlagA1 || differentMotion( A1, IvDC ) ) &&
        ( !availableFlagB1 || differentMotion( B1, IvDC ) ) && (nPbW + nPbH > 12))  ···S3206
        extMergeCandList[ i++ ] = IvDC if( availableFlagVSP && !ic_flag && iv_res_pred_weight_idx == 0 && (nPbW + nPbH > 12))
        extMergeCandList[ i++ ] = VSP                                    ···S3207 if( availableFlagA0 )
        extMergeCandList[ i++ ] = A0                                     ···S3208 if( availableFlagB2 )
        extMergeCandList[ i++ ] = B2                                     ···S3209 if( availableFlagIvMCShift && i < ( 5 + NumExtraMergeCand ) &&
        ( !availableFlagIvMC || differentMotion( IvMC, IvMCShift ) ) && (nPbW + nPbH > 12) )
        extMergeCandList[ i++ ] = IvMCShift                              ···S3210 if (availableFlagIvDCShift && (nPbW + nPbH > 12))
        extMergeCandList[ i++ ] = IvDCShift                              ···S3211
```

(a)

(b)

availableFlagT &= (nPbW + nPbH > 12)

availableFlagIvMC &= (nPbW + nPbH > 12)

availableFlagIvDC &= (nPbW + nPbH > 12)

availableFlagIvMCShift &= (nPbW + nPbH > 12)

availableFlagIvDCShift &= (nPbW + nPbH > 12)

FIG. 25

```
if( availableFlagT )
        extMergeCandList[ i++ ] = T                                    ···S3401 if( availableFlagIvMC  && ( !availableFlagT || differentMotion( T, IvMC ) ) )
        extMergeCandList[ i++ ] = IvMC                                 ···S3402

N = DepthFlag ? T : IvMC
if( availableFlagA1 && ( !availableFlagN || differentMotion( N, A1 ) ) )
        extMergeCandList[ i++ ] = A1
                                                                       ···S3403
if( availableFlagB1 && ( !availableFlagN || differentMotion( N, B1 ) ) )
        extMergeCandList[ i++ ] = B1                                   ···S3404 if( availableFlagB0 )
        extMergeCandList[ i++ ] = B0                                   ···S3405 if( availableFlagIvDC && ( !availableFlagA1 || differentMotion( A1, IvDC ) ) &&
                         ( !availableFlagB1 || differentMotion( B1, IvDC ) ) )
        extMergeCandList[ i++ ] = IvDC                                 ···S3406 if( availableFlagVSP && !ic_flag && iv_res_pred_weight_idx = = 0 )
        extMergeCandList[ i++ ] = VSP                                  ···S3407 if( availableFlagA0 )
        extMergeCandList[ i++ ] = A0                                   ···S3408 if( availableFlagB2 )
        extMergeCandList[ i++ ] = B2                                   ···S3409 if( availableFlagIvMCShift && i < ( 5 + NumExtraMergeCand ) &&
              ( !availableFlagIvMC || differentMotion( IvMC, IvMCShift ) ) )
        extMergeCandList[ i++ ] = IvMCShift
                                                                       ···S3410
if (availableFlagIvDCShift)
        extMergeCandList[ i++ ] = IvDCShift
                                                                       ···S3411
```

FIG. 27

```
VspModeFlag = mergeCandIsVspFlag
        && !ic_flag && ( iv_res_pred_weight_idx
== 0 ) && ( nPbW + nPbH ) > 12)
```

MERGE CANDIDATE DERIVATION DEVICE, IMAGE DECODING DEVICE, AND IMAGE CODING DEVICE

TECHNICAL FIELD

The present invention relates to a merge candidate derivation device, an image decoding device, and an image coding device.

BACKGROUND ART

In image coding techniques for multiple-viewpoint images, disparity prediction coding that reduces the amount of information by predicting disparity between images at the time of coding of multiple-viewpoint images and decoding methods corresponding to the coding methods have been proposed. A vector indicating disparity between viewpoint images is referred to as a disparity vector. A disparity vector is a 2-dimensional vector that has a component (x component) in the horizontal direction and a component (y component) in the vertical direction and is calculated for each block which is a region obtained by splitting one image. To acquire multiple-viewpoint images, it is general to use cameras disposed at respective viewpoints. In coding for multiple-viewpoint images, viewpoint images are coded as different layers in a plurality of layers. A coding method for a moving image formed in a plurality of layers is generally referred to as scalable coding or hierarchical coding. In scalable coding, high coding efficiency is realized by executing prediction between layers. A layer serving as a standard layer, which is not used in prediction between layers, is referred to as a base layer and other layers are referred to as enhancement layers. In a case where layers are formed from viewpoint images, scalable coding is referred to as view scalable coding. At this time, a base layer is also referred to as a base view and an enhancement layer is also referred to as a non-base view. Further, in addition to view scalable coding, scalable coding is referred to as 3-dimensional scalable coding in a case where layers are formed from a texture layer (image layer) and a depth layer (distance image layer).

In scalable coding, there are spatial scalable coding (in which a picture with a low resolution is processed as a base layer and a picture with a high resolution is processed in an enhancement layer), SNR scalable coding (in which a picture with a low resolution is processed as a base layer and a picture with a high resolution is processed in an enhancement layer), and the like as well as view scalable coding. In the scalable coding, for example, a picture of the base layer is used as a reference picture in coding for a picture of an enhancement layer in some cases.

In NPL 1, there is known a technique called viewpoint synthesis prediction in which a predicted image with a high precision is obtained by splitting a prediction unit into small sub-blocks and executing prediction using a disparity vector for each sub-block. In NPL 1, there is a technique called residual prediction in which a residual is predicted using an image of a different view from a target view and is added. In NPL 1, there is known a technique for deriving enhancement merge candidates such as inter-view merge candidates.

CITATION LIST

Non Patent Literature

NPL 1: 3D-HEVC Draft Text 4, JCT3V-F1001-v2, JCT-3V 6th Meeting: CH, 25 Oct.-1 Nov. 2013 (disclosed on 14 Dec. 2013)

SUMMARY OF INVENTION

Technical Problem

In the merge candidate derivation of NPL 1, merge candidates are enhanced for scalable. Since complexity of such enhancement merge candidate derivation is relatively high, a problem may arise in that a processing amount is large when the enhancement merge candidate is used in a case where a prediction unit in which it is necessary to derive many merge candidates is small.

Solution to Problem

According to an aspect of the invention, there is provided a merge candidate derivation device including: a base merge candidate derivation section that derives a base merge candidate; and an enhancement merge candidate derivation section that derives an enhancement merge candidate different from the base merge candidate. In a case where a size of a prediction block is equal to or less than a predetermined size, a base merge candidate list derived from the base merge candidate derivation section is used in a merge candidate list. In other cases, a merge candidate list including a merge candidate list derived from the enhancement merge candidate derivation section is used in the merge candidate list.

According to another aspect of the invention, there is provided a merge candidate derivation device including: a base merge candidate derivation section that derives a base merge candidate; and an enhancement merge candidate derivation section that derives an enhancement merge candidate different from the base merge candidate. In a case where a size of a prediction unit is greater than a predetermined size, a merge candidate derived from the base merge candidate derivation section and a merge candidate derived from the enhancement merge candidate derivation section are added to a merge candidate list. In a case where the size of the prediction unit is equal to or less than the predetermined size, the merge candidate derived from the base merge candidate derivation section is added to the merge candidate list.

According to yet another aspect of the invention, there is provided a merge candidate derivation device including: a base merge candidate derivation section that derives a base merge candidate; and an enhancement merge candidate derivation section that derives an enhancement merge candidate different from the base merge candidate. In a case where a size of a prediction unit is greater than a predetermined size, an enhancement merge candidate is added to a merge candidate list. In a case where the size of the prediction unit is equal to or less than the predetermined size, the enhancement merge candidate is not added to the merge candidate list.

According to yet another aspect of the invention, there is provided a merge candidate derivation device including: a base merge candidate derivation section that derives a base merge candidate; and an enhancement merge candidate derivation section that derives an enhancement merge candidate different from the base merge candidate. In a case where a size of a prediction block is equal to or less than a predetermined size, availability of an enhancement merge candidate is unavailable in the derivation.

According to the aspect of the invention, the predetermined size may be 8, and the enhancement merge candidate is included in a merge candidate list only in a case where both of a width and a height of a prediction unit are equal to or greater than 8.

According to the aspect of the invention, in a case where a sum of a width and a height of the prediction unit is 12, the base merge candidate list derived from the base merge candidate derivation section may be used in the merge candidate list.

According to the aspect of the invention, the enhancement merge candidate may be included in the merge candidate list only in a case where a sum of a width and a height of the prediction unit is greater than 12. According to yet another aspect of the invention, in a case where a size of a prediction block is equal to or less than a predetermined size, a VSP mode flag of a merge mode is not derived from a VSP merge flag of a merge candidate.

According to yet another aspect of the invention, there is provided an image decoding device decoding coded data formed by a plurality of layers. The image decoding device includes the above-described merge candidate derivation device.

According to yet another aspect of the invention, there is provided an image coding device coding coded data formed by a plurality of layers. The image coding device includes the above-described merge candidate derivation device.

Advantageous Effects of Invention

According to the invention, it is possible to obtain the advantageous effect of reducing a processing amount since a case of derivation of the enhancement merge candidates in merge candidate derivation is restricted according to the size of a block.

BRIEF DESCRIPTION OF DRAWINGS

FIG. 2 is a diagram illustrating a hierarchical structure of data of a coded stream according to the embodiment of the invention.

FIG. 9 is a diagram illustrating patterns of splitting modes and FIGS. 9(a) to 9(h) illustrate partition shapes in a case of the splitting modes 2N×N, 2N×N, 2N×nU, 2N×nD, N×2N, nL×2N, nR×2N, and N×N, respectively.

FIG. 12 is a diagram illustrating a sub-block splitting method in a viewpoint synthesis section.

FIG. 18 is a diagram illustrating an example of a merge candidate list.

FIG. 23 is a diagram illustrating all of the operations of a merge candidate derivation section 30361A according to the embodiment.

FIG. 25 is a diagram illustrating an operation of the merge candidate derivation section 30361B according to the embodiment.

FIG. 27 is a diagram illustrating an operation of a merge mode parameter derivation section 3036D according to the embodiment.

DESCRIPTION OF EMBODIMENTS

First Embodiment

Hereinafter, an embodiment of the present invention will be described with reference to the drawings.

Figure 1:
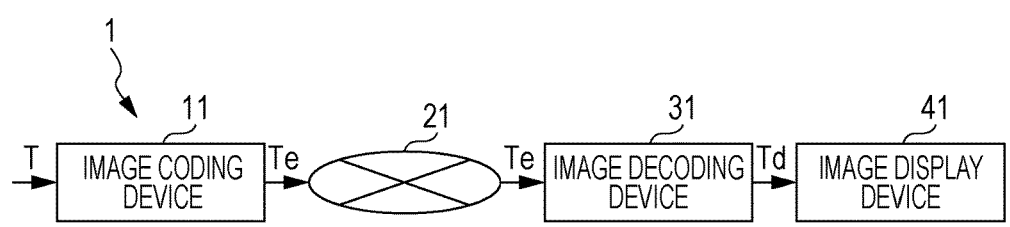
FIG. 1 is a schematic diagram illustrating the configuration of an image transmission system according to an embodiment of the invention.

FIG. 1 is a schematic diagram illustrating the configuration of an image transmission system 1 according to the embodiment of the invention.

The image transmission system 1 is a system that transmits codes obtained by coding a plurality of layer images and displays images obtained by decoding the transmitted codes. The image transmission system 1 is configured to include an image coding device 11, a network 21, an image decoding device 31, and an image display device 41.

Signals T indicating a plurality of layer images (also referred to as texture images) are input to the image coding device 11. The layer images are images viewed or captured at certain resolutions and certain viewpoints. In a case where view scalable coding of coding a 3-dimensional image using a plurality of layer images is executed, each of the plurality of layer images is referred to as a view image. Here, the viewpoint corresponds to an observation point or the position of an imaging device. For example, a plurality of viewpoint images are images obtained when right and left imaging devices image a subject. The image coding device 11 codes the signals to generate coded streams Te (coded data). The details of the coded streams Te will be described below. The viewpoint image is a 2-dimensional image (planar image) observed at a certain viewpoint. The viewpoint image is expressed with, for example, a luminance value or a color signal value of each of the pixels arrayed in a 2-dimensional plane. Hereinafter, one viewpoint image or a signal indicating the viewpoint image is referred to as a picture. In a case where spatial scalable coding is executed using a plurality of layer images, the plurality of layer images are formed of a base layer image with a low resolution and enhancement layer images with high resolutions. In a case where SNR scalable coding is executed using a plurality of layer images, the plurality of layer images are formed of a base layer image with low quality and enhancement layer images with high quality. The view scalable coding, the spatial scalable coding, and the SNR scalable coding may be combined arbitrarily. In the embodiment, coding and decoding of images including at least a base layer image and images (enhancement layer images) other than the base layer image as a plurality of layer images are treated. An image on a referred side in two layers having a reference relation (dependency relation) in images or coding parameters among a plurality of layers is referred to as a first layer image and an image on a referring side is referred to as a second layer image. For example, in a case where there is an enhancement layer image (other than a base layer) coded referring to the base layer, the base layer image is treated as the first layer image and an enhancement layer image is treated as a second layer image. As an example of the enhancement layer image, there is a viewpoint image or a depth image other than a base view.

A depth image (also referred to as a depth map or a "distance image") is a signal value (referred to as a "depth value" or a "depth" corresponding to a distance of a subject or a background contained in an object plane from a viewpoint (an imaging device or the like) and is an image signal formed from a signal value (pixel value) of each of the pixels arrayed in a 2-dimensional plane. The pixels forming a depth image correspond to the pixels forming a viewpoint image. Accordingly, the depth map serves as a clue for expressing a 3-dimensional object plane using a viewpoint image which is an image signal serving as a standard in which an object plane is projected to a 2-dimensional plane.

The network 21 transmits the coded streams Te generated by the image coding device 11 to the image decoding device 31. The network 21 is the Internet, a wide area network (WAN), a local area network (LAN), or a combination thereof. The network 21 is not necessarily limited to a bi-directional communication network, but may be a uni-directional or bi-directional communication network in which broadcast waves of terrestrial digital broadcast or satellite broadcast are transmitted. The network 21 may be substituted with a storage medium that stores the coded streams Te, such as a digital versatile disc (DVD) or a Blu-ray (BD) disc.

The image decoding device 31 decodes the coded streams Te transmitted by the network 21 to generate a plurality of decoded layer images Td (decoded viewpoint images Td).

The image display device 41 displays some or all of the plurality of decoded layer images Td generated by the image decoding device 31. For example, in the view scalable coding, in the case where all of the decoded layer images are displayed, 3-dimensional images (stereoscopic images) or free viewpoint images are displayed. In the case where some of the decoded layer images are displayed, 2-dimensional images are displayed. The image display device 41 includes, for example, a display device such as a liquid crystal display or an organic electro-luminescence (EL) display. In the spatial scalable coding and the SNR scalable coding, in a case where the image decoding device 31 and the image display device 41 have a high processing capability, enhancement layer images with high quality are displayed. In a case where the image decoding device 31 and the image display device 41 have a lower processing capability, base layer images for which a processing capability or a display capability is not necessary in an enhancement layer are displayed.

<Structure of Coded Stream Te>

The data structure of the coded stream Te generated by the image coding device 11 and decoded by the image decoding device 31 will be described before the image coding device 11 and the image decoding device 31 according to the embodiment are described.

FIG. 2 is a diagram illustrating the hierarchical structure of data of the coded stream Te. The coded stream Te includes, for example, a sequence and a plurality of pictures forming the sequence. FIGS. 2(a) to 2(f) are diagrams illustrating a sequence layer establishing a sequence SEQ, a picture layer defining pictures PICT, a slice layer defining slices S, a slice data layer defining slice data, a coding tree layer defining a coding tree unit included in slice data, and a coding unit layer defining a coding unit (CU) included in a coding tree.

(Sequence Layer)

In the sequence layer, a set of data which is referred to by the image decoding device 31 is defined to decode the processing target sequence SEQ (hereinafter also referred to as a target sequence). As illustrated in FIG. 2(a), the sequence SEQ includes a video parameter set, a sequence parameter set (SPS), a picture parameter set PPS, picture PICTs, and supplemental enhancement information (SEI). Here, a value suffixed after # indicates a layer ID (nuh_layer_id). In FIG. 2, an example in which there is coded data of #0 and #1, that is, layer 0 and layer 1, is illustrated, but the kinds of layers and the number of layers are not limited thereto. A layer of which a layer ID (nuh_layer_id) is 0 corresponds to a base layer and a layer of which a layer ID (nuh_layer_id) is a value other than 0 corresponds to an enhancement layer.

In the video parameter set VPS, a set of coding parameters common to a plurality of moving images in a moving image formed by a plurality of layers and a set of coding parameters related to the plurality of layers and an individual layer included in the moving image are defined.

In the sequence parameter set SPS, a set of coding parameters which are referred to by the image decoding device 31 to decode the target sequence is defined. For example, the width or the height of a picture is defined.

In the picture parameter set PPS, a set of coding parameters which are referred to by the image decoding device 31 to decode each picture in a target sequence is defined. For example, a standard value (pic_init_qp_minus26) of a quantization width used to decode a picture or a flag (weighted_pred_flag) indicating application of weighted prediction are included. There may be a plurality of PPSs. In this case, any of the plurality of PPSs is selected from each picture in the target sequence.

(Picture Layer)

In the picture layer, a set of data which is referred to by the image decoding device 31 to decode a processing target picture PICT (hereinafter also referred to as a target picture) is defined. As illustrated in FIG. 2(b), the picture PICT includes slices S0 to SNS-1 (where NS is a total number of slices included in the picture PICT).

Hereinafter, in a case where it is not necessary to distinguish the slices S0 to SNS-1 from each other, the suffixes of the reference numerals are omitted in description in some cases. The same also applies data which is included in the coded stream Te to be described below and other data to which suffixes are attached.

(Slice Layer)

In the slice layer, a set of data which is referred to by the image decoding device 31 to decode a processing target slice S (also referred to as a target slice) is defined. As illustrated in FIG. 2(c), the slice S includes a slice header SH and slice data SDATA.

The slice header SH include a coding parameter group which is referred to by the image decoding device 31 to decide a target slice decoding method. Slice type designation information (slice_type) designating a type of slice is an example of a coding parameter included in the slice header SH.

As the types of slices which can be designated by the slice type designation information, (1) an I slice in which only intra-prediction is used at the time of coding, (2) a P slice in which uni-directional prediction or intra-prediction are used at the time of coding, and (3) a B slice in which uni-directional prediction, bi-directional prediction, or intra-prediction is used at the time of coding can be exemplified.

The slice header SH may include a reference (pic_parameter_set_id) to the picture parameter set PPS which is included in the sequence layer.

(Slice Data Layer)

In the slice data layer, a set of data which is referred to by the image decoding device 31 to decode the processing target slice data SDATA is defined. As illustrated in FIG. 2(d), the slice data SDATA includes a coded tree block (CTB). The CTB is a block with a fixed size (for example, 64×64) forming a slice and is also referred to as a largest cording unit (LCU) in some cases.

(Coding Tree Layer)

In the coding tree layer, as illustrated in FIG. 2(e), a set of data which is referred to by the image decoding device 31 to decode a processing target coded tree block is defined. The coded tree unit is split through recursive quadtree splitting. A node of a tree structure obtained through the recursive quadtree splitting is referred to as a coding tree. An immediate node of a quadtree is defined as a coded tree unit (CTU) and the coded tree block is also defined as a highest CTU. The CTU includes a split flag (split_flag). In a case where split_flag is 1, the coded tree unit is split to four coded tree units CTU. In a case where split_flag is 0, the coded tree unit CTU is split into four coded units (CU). The coded unit CU is an end node of the coding tree and no further splitting is executed in this layer. The coded unit CU is a base unit of a coding process.

In a case where the coded tree block CTB has a size of 64×64 pixels, the size of the coded unit CU can be one of 64×64 pixels, 32×32 pixels, 16×16 pixels, and 8×8 pixels.

(Coding Unit Layer)

In the coding unit layer, as illustrated in FIG. 2(f), a set of data referred to by the image decoding device 31 to decode the coding unit of a processing target is defined. Specifically, the coding unit is configured to include a CU header CUH, a prediction tree, a transform tree, a CU header CUF. In the CU header CUH, for example, whether the coding unit is a unit used for intra-prediction or a unit used for inter-prediction is defined. In the CU header CUH, the coding unit includes a residual prediction weight index iv_res_pred_weight_idx indicating a weight (or whether to execute residual prediction) used for residual prediction or an illuminance compensation flag ic_flag indicating whether to use illuminance compensation prediction. The coding unit is a root of a prediction tree (PT) and a transform tree (TT). The CU header CUF is included between the prediction tree and the transform tree or after the transform tree.

In the prediction tree, the coding unit is split into one prediction block or a plurality of prediction blocks and the position and size of each prediction block are defined. In other words, the prediction block is a region included in the coding unit and one or plurality of regions which do not overlap with each other. The prediction tree includes one prediction block or a plurality of prediction blocks obtained through the above-described splitting.

The prediction process is executed for each prediction block. Hereinafter, the prediction block which is a unit of prediction is referred to as a prediction unit (PU).

Roughly speaking, there are two types of splitting in the prediction tree in the case of intra-prediction and the case of inter-prediction. The intra-prediction refers to prediction in the same picture and the inter-prediction refers to a prediction process executed between mutually different pictures (for example, between display times or between layer images).

In the case of intra-prediction, there are 2N×2N (which is the same size of the coding unit) and N×N splitting methods.

In the case of inter-prediction, coding is executed in part_mode of the coded data in a splitting method. In the splitting mode designated in a splitting mode part_mode, there are a total of the following 8 types of patterns when the size of the target CU is set to 2N×2N. That is, there are four symmetric splittings, 2N×2N pixels, 2N×N pixels, N×2N pixels, and N×N pixels, and four asymmetric motion partitions (AMP), 2N×nU pixels, 2N×nD pixels, nL×2N pixels, and nR×2N pixels. $N=2^m$ (where m is any integer equal to or greater than 1) is meant. Hereinafter, a prediction block of which the splitting mode is the asymmetric motion partition is also referred to as an AMP block. Since the number of splittings is one of 1, 2, and 4, the number of PUs included in the CU is 1 to 4. The PUs are expressed as PU0, PU1, PU2, and PU3 in order.

FIGS. 9(a) to 9(h) specifically illustrate the positions of boundaries of PU splitting in the CU in the splitting modes.

Figure 9:
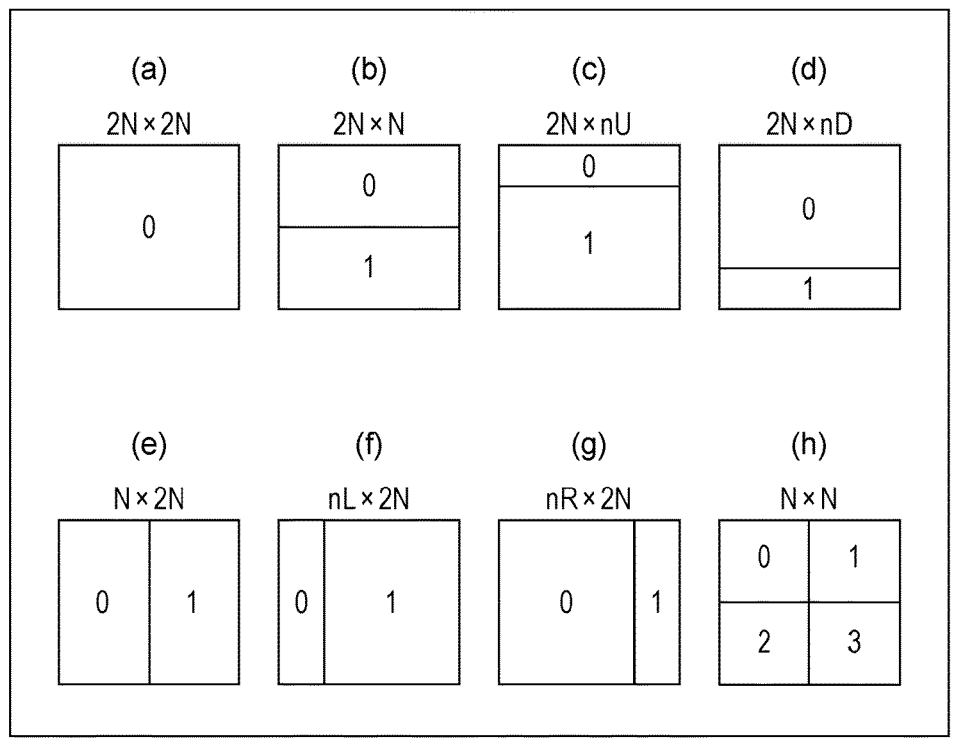

FIG. 9(a) illustrates the splitting mode of 2N×2N in which splitting of the CU is not executed. FIGS. 9(b) and 9(e) illustrate the shapes of partition in a case where the splitting modes 2N×N and N×2N, respectively. FIG. 9(h) illustrates the shape of partition in a case where the splitting mode is N×N.

FIGS. 9(c), 9(d), 9(f), and 9(g) illustrate the shapes of partition in cases of 2N×nU, 2N×nD, nL×2N, and nR×2N which are the asymmetric motion partitions (AMP), respectively.

FIGS. 9(a) to 9(h), numbers given in regions indicate identification numbers of the regions and a process is executed in the regions in the order of the identification numbers. That is, the identification numbers indicate a scanning order of the regions.

In the prediction block in the case of the inter-prediction, 7 types of splitting modes except for N×N (see FIG. 9(h)) are defined among the 8 types of splitting modes.

A specific value of N is defined in accordance with the size of the CU to which the PU belongs, and specific values of nU, nD, nL, and nR are decided according to the value of N. For example, a CU of 32×32 pixels can be split into prediction blocks of the inter-prediction of 32×32 pixels, 32×16 pixels, 16×32 pixels, 32×16 pixels, 32×8 pixels, 32×24 pixels, 8×32 pixels, and 24×32 pixels.

In the transform tree, the coding unit is split into one transform block or a plurality of transform blocks and the position and size of each transform block are defined. In other words, the transform block is a region included in the coding unit and one or plurality of regions which do not overlap with each other. The transform tree includes one transform block or a plurality of transform blocks obtained through the above-described splitting.

As the splitting of the transform tree, there is splitting in which a region with the same size as the coding unit is allocated as the transform block and splitting by recursive quadtree splitting, as in the splitting of the above-described tree block.

A transform process is executed for each transform block. Hereinafter, the transform block which is a unit of transform is referred to as a transform unit (TU).

(Prediction Parameter)

A predicted image of the prediction unit is derived by a prediction parameter subordinate to the prediction unit. As the prediction parameter, there is a prediction parameter of intra-prediction or a prediction parameter of inter-prediction. Hereinafter, the prediction parameter of inter-prediction (inter-prediction parameter) will be described. The inter-prediction parameter is configured to include prediction list use flags predFlagL0 and predFlagL1, reference picture indexes refIdxL0 and refIdxL1, and vectors mvL0 and mvL1. The prediction list use flags predFlagL0 and predFlagL1 are flags indicating whether to use reference picture lists respectively called an L0 list and an L1 list, and the reference picture list corresponding to the case of a value of 1 is used. In a case where "a flag indicating whether XX is indicated" is described in the present specification, 1 is set to a case where XX is indicated and 0 is set to a case where XX is not indicated. Then, 1 is treated to be true and 0 is treated to be false in logical NOT, logical AND, or the like (the same applies below). However, in actual devices or methods, other values can also be used as a true value and a false value. A case where two reference picture lists are used, that is, a case of (predFlagL0, predFlagL1)=(1, 1), corresponds to bi-prediction. A case where one reference picture list is used, that is, a case of (predFlagL0, predFlagL1)=(1, 0), or (predFlagL0, predFlagL1)=(0, 1), corresponds to uni-prediction. Information regarding the prediction list use flag can also be expressed as an inter-prediction flag inter_pred_idc to be described below. Normally, the prediction list use flag is used in a predicted image generation section and a prediction parameter memory to be described below. In a case where information indicating which reference picture list is used or not is decoded from the coded data, the inter-prediction flag inter_pred_idc is used.

Examples of syntax components used to derive the inter-prediction parameter included in the coded data include a splitting mode part_mode, a merge flag merge_flag, a merge index merge_idx, an inter-prediction flag inter_pred_idc, a reference picture index refIdxLX, a prediction vector flag mvp_LX_flag, and a difference vector mvdLX.

(Example of Reference Picture List)

Figure 3:
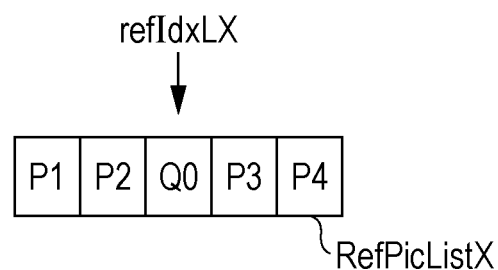
FIG. 3 is a conceptual diagram illustrating an example of a reference picture list.

Next, an example of the reference picture list will be described. The reference picture list is a line formed by reference pictures stored in a reference picture memory 306 (see FIG. 5). FIG. 3 is a conceptual diagram illustrating an example of the reference picture list RefPicListX. In the reference picture list RefPicListX, 5 rectangles arranged horizontally in a line indicate reference pictures. Codes P1, P2, Q0, P3, and P4 shown in order from the left end to the right are codes indicating reference pictures. P such as P1 indicates a viewpoint P and Q such as Q0 indicates a different viewpoint Q from the viewpoint P. The suffixes of P and Q indicate picture order counts POC. A downward arrow immediately below refIdxLX indicates that the reference picture index refIdxLX is an index referring to the reference picture Q0 in the reference picture memory 306.

(Example of Reference Picture)

Figure 4:
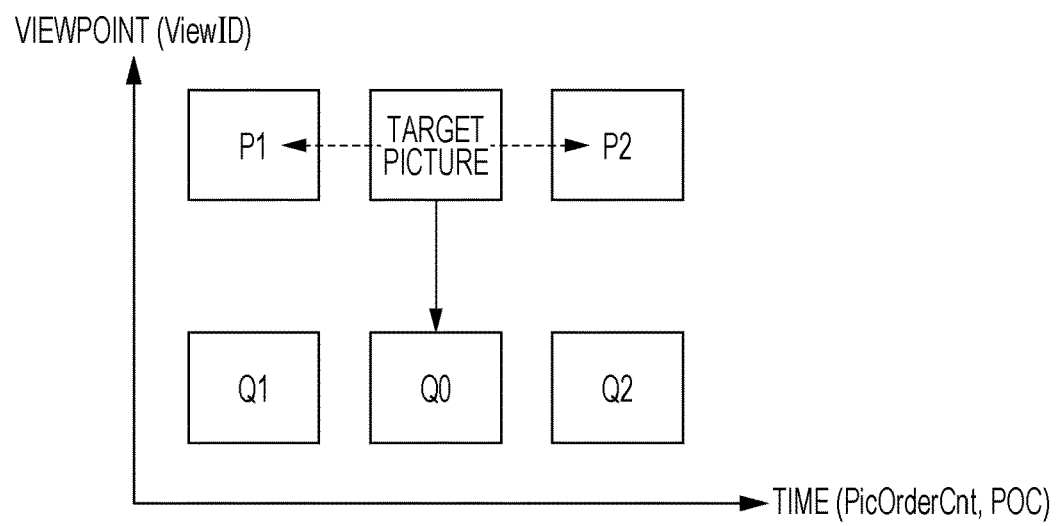
FIG. 4 is a conceptual diagram illustrating an example of a reference picture.

Next, an example of the reference picture used at the time of derivation of a vector will be described. FIG. 4 is a conceptual diagram illustrating an example of the reference picture. In FIG. 4, the horizontal axis represents a display time and the vertical axis represents a viewpoint. As illustrated in FIG. 4, rectangles of 2 vertical rows and 3 horizontal columns (a total of 6 rectangles) indicate pictures. Of the 6 rectangles, the second rectangle from the left in the low row indicates a picture of a decoding target (target picture). The remaining five rectangles indicate reference pictures. A reference picture Q0 indicated by an upward arrow from the target picture is a picture of which a display time is the same as the target picture and a viewpoint (view ID) is different from the target picture. In disparity prediction in which a target picture serves as a standard, the reference picture Q0 is used. A reference picture P1 indicated by a leftward arrow from the target picture is a past picture of which the viewpoint is the same as the target picture. A reference picture P2 indicated by a rightward arrow from the target picture is a future picture of which the viewpoint is the same as the target picture. In motion prediction in which a target picture serves as a criterion, the reference picture P1 or P2 is used.

(Inter-prediction Flag and Prediction List Use Flag)

A relation between the inter-prediction flag inter_pred_idc and the prediction list use flags predFlagL0 and predFlagL1 can be mutually converted using formulae:

$$\text{inter\_pred\_}idc = (\text{predFlag}L1 << 1) + \text{predFlag}L0$$

$$\text{predFlag}L0 = \text{inter\_pred\_}idc \ \& \ 1$$

predFlagL1=inter_pred_idc>>1. Here, >> is a right shift and << is a left shift. Therefore, as the inter-prediction parameter, the prediction list use flags predFlagL0 and predFlagL1 may be used or the inter-prediction flag inter_pred_idc may be used. Hereinafter, in determination in which the prediction list use flags predFlagL0 and predFlagL1 are used, the flags can also be substituted with the inter-prediction flag inter_pred_idc. In contrast, in determination in which the inter-prediction flag inter_pred_idc is used, the flag can also be substituted with the prediction list use flags predFlagL0 and predFlagL1.

(Merge Mode and AMVP Prediction)

In a method of decoding (coding) the prediction parameter, there are a merge mode and an adaptive motion vector prediction (AMVP) mode. The merge flag merge_flag is a flag used to identify these modes. In either the merge mode or the AMVP mode, a prediction parameter of a target PU is derived using the prediction parameter of the block which has already been processed. The merge mode is a mode in which the prediction list use flag predFlagLX (the inter-prediction flag inter_pred_idc), the reference picture index refIdxLX, and the vector mvLX are not included in coded data and is a mode in which the already derived prediction parameters are used without change. The AMVP mode is a mode in which the inter-prediction flag inter_pred_idc, the reference picture index refIdxLX, and the vector mvLX are included in coded data. The vector mvLX is coded as a difference vector (mvdLX) and a prediction vector flag mvp_LX_flag indicating a prediction vector.

The inter-prediction flag inter_pred_idc is data indicating the types and numbers of reference pictures and has a value of one of Pred_L0, Pred_L1, and Pred_BI. Pred_L0 and Pred_L1 each indicate that reference pictures stored in the reference picture lists referred to as the L0 list and the L1 list are used and both indicate that one reference picture is used (uni-prediction). The prediction using the L0 list and the L1 list are referred to as L0 prediction and L1 prediction, respectively. Pred_BI indicates that 2 reference pictures are used (bi-prediction) and indicates that 2 reference pictures stored in the L0 list and the L1 list are used. The prediction vector index mvp_LX_flag is an index indicating a prediction vector and the reference picture index refIdxLX is an index indicating the reference picture stored in the reference picture list. LX is a description method used in a case where the L0 prediction and the L1 prediction are not distinguished from each other and distinguish the parameter in regard to the L0 list from the parameter with regard to the L1 list by substituting the LX with L0 or L1. For example, refIdxL0 is a reference picture index used for the L0 prediction, refIdxL1 is a reference picture index used for the L1 prediction, and refIdx (refIdxLX) is notation used in a case where refIdxL0 and refIdxL1 are not distinguished from each other.

The merge index merge_idx is an index indicating that one prediction parameter among prediction parameter candidates (merge candidates) derived from the completely processed block is used as a prediction parameter of the prediction unit (target block).

(Motion Vector and Disparity Vector)

As the vector mvLX, there are a motion vector and a disparity vector (parallax vector). The motion vector is a vector that indicates a position deviation between the position of a block in a picture of a certain layer at a certain display time and the position of a corresponding block in the picture of the same layer at a different display time (for example, an adjacent discrete time). The disparity vector is a vector that indicates a position deviation between the position of a block in a picture of a certain layer at a certain display time and the position of a corresponding block in a picture of a different layer at the same display time. The picture of the different layer is a picture with a different viewpoint in some cases or is a picture with a different resolution in some cases. In particular, the disparity vector corresponding to the picture with the different viewpoint is referred to as a parallax vector. In the following description, in a case where the motion vector and the disparity vector are not distinguished from each other, the motion vector and the disparity vector are simply referred to as vectors mvLX. A prediction vector and a difference vector in regard to the vector mvLX are referred to as a prediction vector mvpLX and a difference vector mvdLX, respectively. Whether the vector mvLX and the difference vector mvdLX are the motion vectors or the disparity vectors is executed using the reference picture index refIdxLX subordinate to the vector.

(Configuration of Image Decoding Device)

Figure 5:
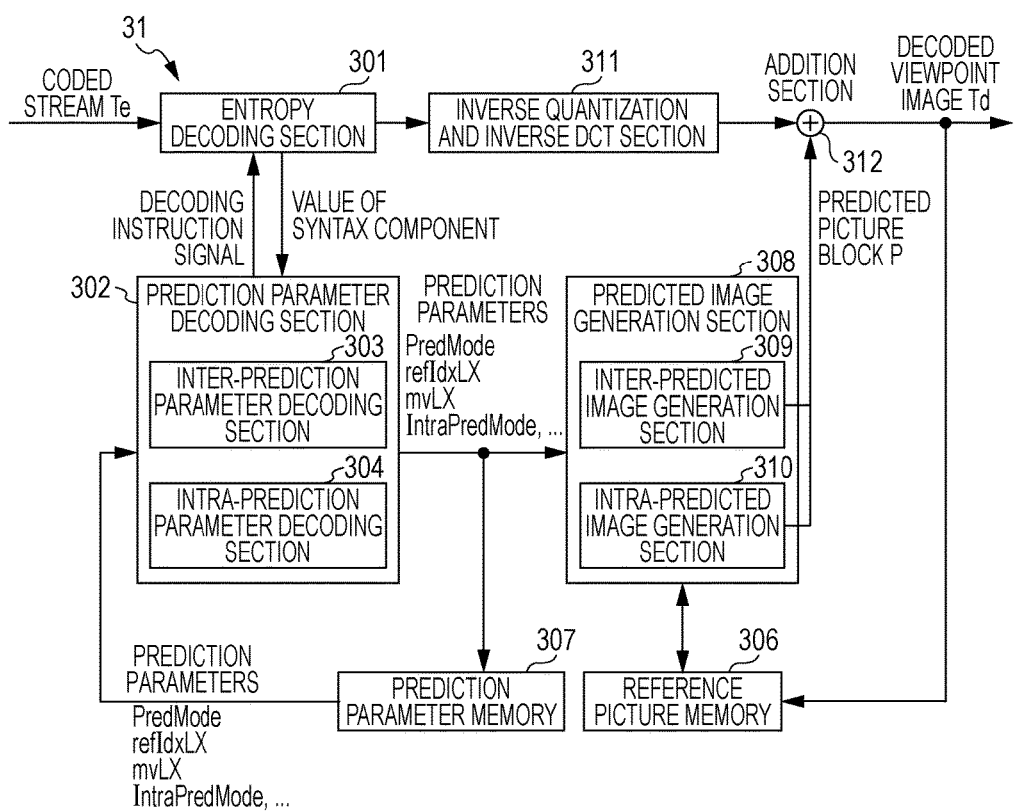
FIG. 5 is a schematic diagram illustrating the configuration of an image decoding device according to the embodiment.

Next, the configuration of the image decoding device 31 according to the embodiment will be described. FIG. 5 is a schematic diagram illustrating the configuration of the image decoding device 31 according to the embodiment. The image decoding device 31 is configured to include an entropy decoding section 301, a prediction parameter decoding section 302, a reference picture memory (reference image storage section or a frame memory) 306, a prediction parameter memory (prediction parameter storage section or a frame memory) 307, a predicted image generation section 308, an inverse quantization and inverse DCT section 311, an addition section 312, and a depth DV derivation section 351 (not illustrated). The image decoding device 31 is image decoding means for decoding coded data which is formed by a plurality of viewpoint images and depth images and is formed by a base layer and enhancement layers.

The prediction parameter decoding section 302 is configured to include an inter-prediction parameter decoding section 303 and an intra-prediction parameter decoding section 304. The predicted image generation section 308 is configured to include an inter-predicted image generation section 309 and an intra-predicted image generation section 310.

The entropy decoding section 301 executes entropy decoding on the coded stream Te input from the outside, and separates and decodes individual codes (syntax components). As the separated code, there are, for example, prediction information used to generate a predicted image and residual information used to generate a difference image.

The entropy decoding section 301 outputs some of the separated codes to the prediction parameter decoding section 302. Some of the separated codes are, for example, a prediction mode PredMode, the splitting mode part_mode, the merge flag merge_flag, the merge index merge_idx, the inter-prediction flag inter_pred_idc, the reference picture index refIdxLX, the prediction vector flag mvp_LX_flag, the difference vector mvdLX, the residual prediction weight index iv_res_pred_weight_idx, and the illuminance compensation flag ic_flag. Which codes are decoded is controlled based on an instruction of the prediction parameter decoding section 302. The entropy decoding section 301 outputs a quantization coefficient to the inverse quantization and inverse DCT section 311. The quantization coefficient is a coefficient which is quantized and obtained by executing discrete cosine transform (DCT) on a residual signal in a coding process. The entropy decoding section 301 outputs a depth DV conversion table DepthToDisparityB to the depth DV derivation section 351. The depth DV conversion table DepthToDisparityB is a table for converting the pixel value of a depth image into a parallax indicating disparity between viewpoint images, and the component DepthToDisparityB[d] of the depth DV conversion table DepthToDisparityB can be obtained using a slope cp_scale, an offset cp_off, and slope precision cp_precision by the following formula:

Log 2 Div=BitDepth$Y$−1+$cp$_precision offset=($cp$_off<<BitDepth$Y$)+((1<<log 2 Div)>>1)

scale=$cp$_scale

DepthToDisparity$B$[$d$]=(scale*$d$+offset)>>log 2 Div.

The parameters cp_scale, cp_off, and cp_precision are decoded from a parameter set in the coded data at each preferred viewpoint. BitDepthY indicates a bit depth of a pixel value corresponding to a luminance signal and has, for example, 8 as a value.

The prediction parameter decoding section 302 receives some of the codes as inputs from the entropy decoding section 301. The prediction parameter decoding section 302 decodes the prediction parameters corresponding to the prediction mode indicated by the prediction mode PredMode which is a part of the codes. The prediction parameter decoding section 302 outputs the prediction mode PredMode and the decoded prediction parameters to the prediction parameter memory 307 and the predicted image generation section 308.

The inter-prediction parameter decoding section 303 decodes an inter-prediction parameter with reference to the prediction parameters stored in the prediction parameter memory 307 based on the codes input from the entropy decoding section 301. The inter-prediction parameter decoding section 303 outputs the decoded inter-prediction parameters to the predicted image generation section 308 and stores the decoded inter-prediction parameters in the prediction parameter memory 307. The details of the inter-prediction parameter decoding section 303 will be described below.

The intra-prediction parameter decoding section 304 decodes the intra-prediction parameter with reference to the prediction parameter stored in the prediction parameter memory 307 based on the codes input from the entropy decoding section 301. The intra-prediction parameter refers to a parameter used for a process of predicting a picture block in one picture and is, for example, an intra-prediction mode intraPredMode. The intra-prediction parameter decoding section 304 outputs the decoded intra-prediction parameter to the predicted image generation section 308 and stores the decoded intra-prediction parameter in the prediction parameter memory 307.

The reference picture memory 306 stores a decoded picture block recSamples generated by the addition section 312 at the position of the decoded picture block.

The prediction parameter memory 307 stores the prediction parameter at a position decided in advance for each decoding target picture and block. Specifically, the prediction parameter memory 307 stores the inter-prediction parameter decoded by the inter-prediction parameter decoding section 303, the intra-prediction parameter decoded by the intra-prediction parameter decoding section 304, and the prediction mode PredMode separated by the entropy decoding section 301. As the stored inter-prediction parameter, for example, there are the prediction list use flag predFlagLX, the reference picture index refIdxLX, and the vector mvLX.

The prediction mode PredMode and the prediction parameter are input from the prediction parameter decoding section 302 to the predicted image generation section 308. The predicted image generation section 308 reads the reference picture from the reference picture memory 306. The predicted image generation section 308 generates a predicted picture block predSamples (predicted image) using the input prediction parameters and the read reference picture in the prediction mode indicated by the prediction mode PredMode.

Here, in a case where the prediction mode PredMode indicates an inter-prediction mode, the inter-predicted image generation section 309 generates the predicted picture block predSamples through the inter-prediction using the inter-prediction parameter input from the inter-prediction parameter decoding section 303 and the read reference picture. The predicted picture block predSamples corresponds to the prediction unit PU. The PU corresponds to a part of a picture which is formed by a plurality of pixels and is a unit in which the prediction process is executed, as described above, that is, a decoding target block subjected to a prediction process once.

The inter-predicted image generation section 309 reads, from the reference picture memory 306, the reference picture block located at the position indicated by the vector mvLX using the prediction unit as a standard from the reference picture RefPicListLX[refIdxLX] indicated by the reference picture index refIdxLX in regard to the reference picture list (the L0 list or the L1 list) in which the prediction list use flag predFlagLX is 1. The inter-predicted image generation section 309 executes motion compensation on the read reference picture block to generate a predicted picture block predSamplesLX. The inter-predicted image generation section 309 generates the predicted picture block predSamples from predicted picture blocks predSamplesL0 and predSamplesL1 and outputs the predicted picture block predSamples to the addition section 312.

In a case where the prediction mode predMode indicates the intra-prediction mode, the intra-predicted image generation section 310 executes the intra-prediction using the intra-prediction parameter input from the intra-prediction parameter decoding section 304 and the read reference picture. Specifically, the intra-predicted image generation section 310 reads, from the reference picture memory 306, the reference picture block which is the decoding target picture and is within a pre-decided range from the prediction unit among the already processed blocks. The pre-decided range is, for example, a range of the left, top left, top, and top right of adjacent blocks and is different according to the intra-prediction mode.

The intra-predicted image generation section 310 executes the prediction on the read reference picture block in the prediction mode indicated by the intra-prediction mode IntraPredMode to generate the predicted picture block predSamples, and then outputs the generated predicted picture block predSamples to the addition section 312.

The inverse quantization and inverse DCT section 311 executes inverse quantization on the quantization coefficient input from the entropy decoding section 301 to obtain a DCT coefficient. The inverse quantization and inverse DCT section 311 executes inverse discrete cosine transform (DCT) on the obtained DCT coefficient to calculate a decoded residual signal. The inverse quantization and inverse DCT section 311 outputs the calculated decoded residual signal to the addition section 312.

The addition section 312 adds the predicted picture blocks predSamples input from the inter-predicted image generation section 309 and the intra-predicted image generation section 310 and the signal value resSamples of the decoded residual signal input from the inverse quantization and inverse DCT section 311 for each pixel to generate decoded picture blocks recSamples. The addition section 312 outputs the generated decoded picture blocks recSamples to the reference picture memory 306. The decoded picture blocks are integrated for each picture. Loop filters such as a deblock filter and an adaptive offset filter are applied to the decoded picture. The decoded picture is output as the decoded layer image Td to the outside.

(Configuration of Inter-prediction Parameter Decoding Section)

Figure 6:
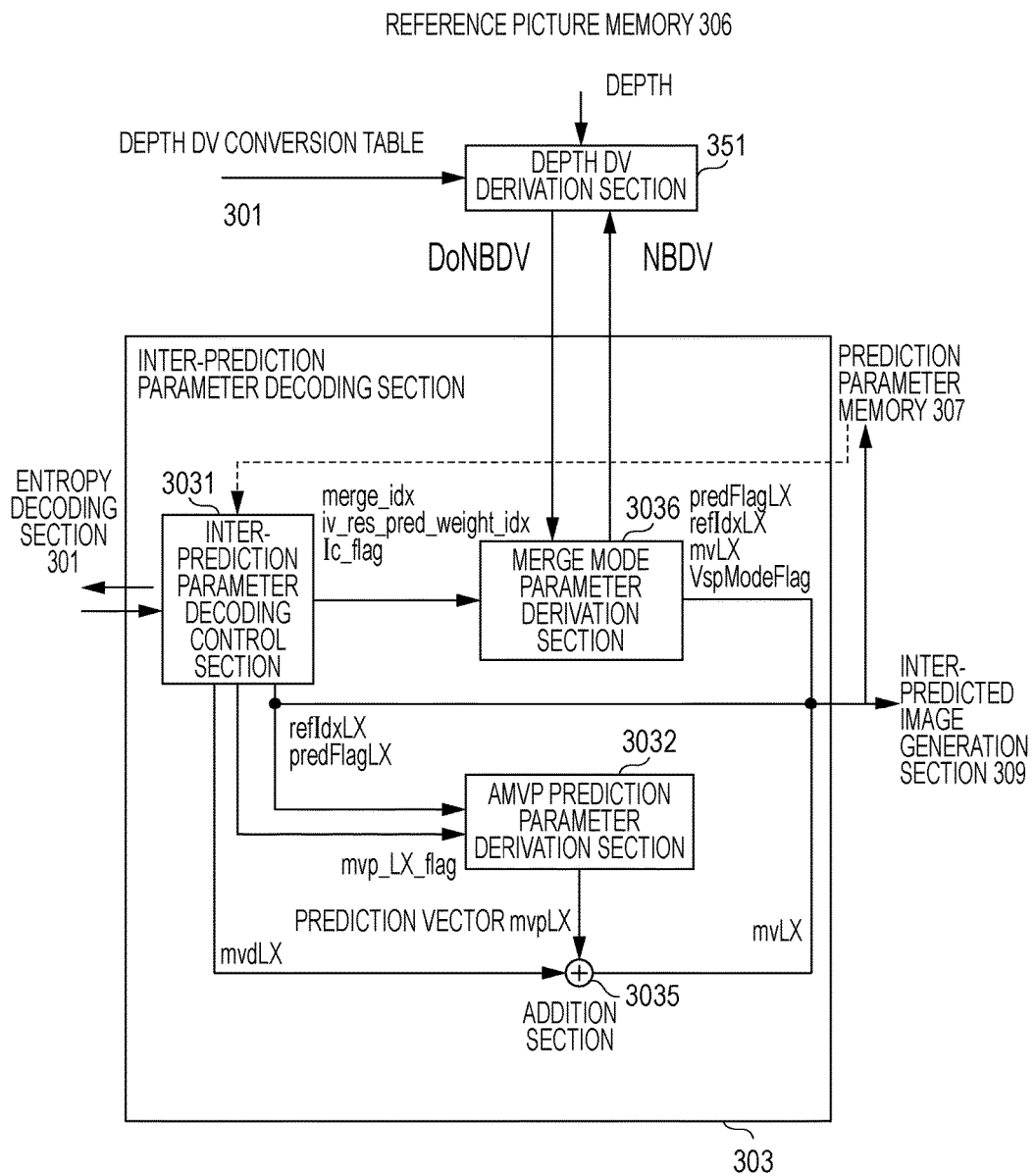
FIG. 6 is a schematic diagram illustrating the configuration of an inter-prediction parameter decoding section according to the embodiment.

Next, the configuration of the inter-prediction parameter decoding section 303 will be described. FIG. 6 is a schematic diagram illustrating the configuration of the inter-prediction parameter decoding section 303 according to the embodiment. The inter-prediction parameter decoding section 303 is configured to include an inter-prediction parameter decoding control section 3031, an AMVP prediction parameter derivation section 3032, an addition section 3035, a merge mode parameter derivation section 3036, and a disparity derivation section 30363.

The inter-prediction parameter decoding control section 3031 instructs the entropy decoding section 301 to decode the codes (syntax components related to the inter-prediction and extracts codes (syntax components) included in the coded data, for example, the splitting mode part_mode, the merge flag merge_flag, the merge index merge_idx, the inter-prediction flag inter_pred_idc, the reference picture index refIdxLX, the prediction vector flag mvp_LX_flag, the difference vector mvdLX, the residual prediction weight index iv_res_pred_weight_idx, and the illuminance compensation flag ic_flag. In a case where the inter-prediction parameter decoding control section 3031 expresses the extraction of certain syntax components, it is meant that the inter-prediction parameter decoding control section 3031 instructs the entropy decoding section 301 to decode the certain syntax components and reads the corresponding syntax components from the coded data.

In a case where the merge flag merge_flag is 1, that is, the prediction unit is in the merge mode, the inter-prediction parameter decoding control section 3031 extracts, for example, the merge index merge_idx from the coded data. The inter-prediction parameter decoding control section 3031 outputs the extracted residual prediction weight index iv_res_pred_weight_idx, the illuminance compensation flag ic_flag, and the merge index merge_idx to the merge mode parameter derivation section 3036.

In a case where the merge flag merge_flag is 0, that is, the prediction block is in the AMVP prediction mode, the inter-prediction parameter decoding control section 3031 extracts the inter-prediction flag inter_pred_idc, the reference picture index refIdxLX, the prediction vector flag mvp_LX_flag, and the difference vector mvdLX from the coded data using the entropy decoding section 301. The inter-prediction parameter decoding control section 3031 outputs the predicted list use flag predFlagLX and the reference picture index refIdxLX derived from the extracted inter-prediction flag inter_pred_idc to the AMVP prediction parameter derivation section 3032 and the predicted image generation section 308 (see FIG. 5) and stores the predicted list use flag predFlagLX and the reference picture index refIdxLX in the prediction parameter memory 307 (see FIG. 5). The inter-prediction parameter decoding control section 3031 outputs the extracted prediction vector flag mvp_LX_flag to the AMVP prediction parameter derivation section 3032 and outputs the extracted difference vector mvdLX to the addition section 3035.

The disparity vector derivation section 30363 extracts disparity vectors of the coding unit (target CU) to which the target PU belongs from blocks spatially or temporally adjacent to the coding unit. Specifically, a block Col temporally adjacent to the target CU, a second block AltCol temporally adjacent to the target CU, a block A1 spatially left adjacent to the target CU, and a block B1 upward adjacent to the target CU are set as reference blocks, the prediction flags predFlagLX, the reference picture indexes refIdxLX, and the vectors mvLX of the reference blocks are sequentially read, and it is determined whether the adjacent blocks include disparity vectors from the reference picture indexes refIdxLX of the adjacent blocks. In a case where the adjacent blocks have the disparity vectors, the disparity vectors of the reference blocks are output. In a case where there is no disparity vector in the prediction parameters of the adjacent blocks, the prediction parameters of subsequently adjacent blocks are read and the disparity vectors are derived similarly. In a case where the disparity vectors may not be derived in all the adjacent blocks, zero vectors are output as the disparity vectors. The disparity vector derivation section 30363 outputs the reference picture index and the view ID of the block from which the disparity vector is derived.

The disparity vector obtained above is referred to as a neighbor base disparity vector (NBDV). The disparity vector derivation section 30363 outputs the further obtained disparity vector NBDV to the depth DV derivation section 351. The depth DV derivation section 351 updates the input disparity vector in accordance with the depth-originated disparity vector. The updated disparity vector is referred to as a depth orientated neighbour base disparity vector (DoNBDV). The disparity vector derivation section 30363 outputs the disparity vector (DoNBDV) to an inter-layer merge candidate derivation section 3036121, a disparity merge candidate derivation section, and a viewpoint synthesis prediction merge candidate derivation section. Further, the obtained disparity vector (NBDV) is output to the inter-predicted image generation section 309.

The inter-prediction parameter decoding control section 3031 outputs the disparity vector (NBDV) derived at the time of derivation of the inter-prediction parameters and a VSP mode flag VspModeFlag which is a flag indicating whether viewpoint synthesis prediction is executed, to the inter-predicted image generation section 309.

Figure 7:
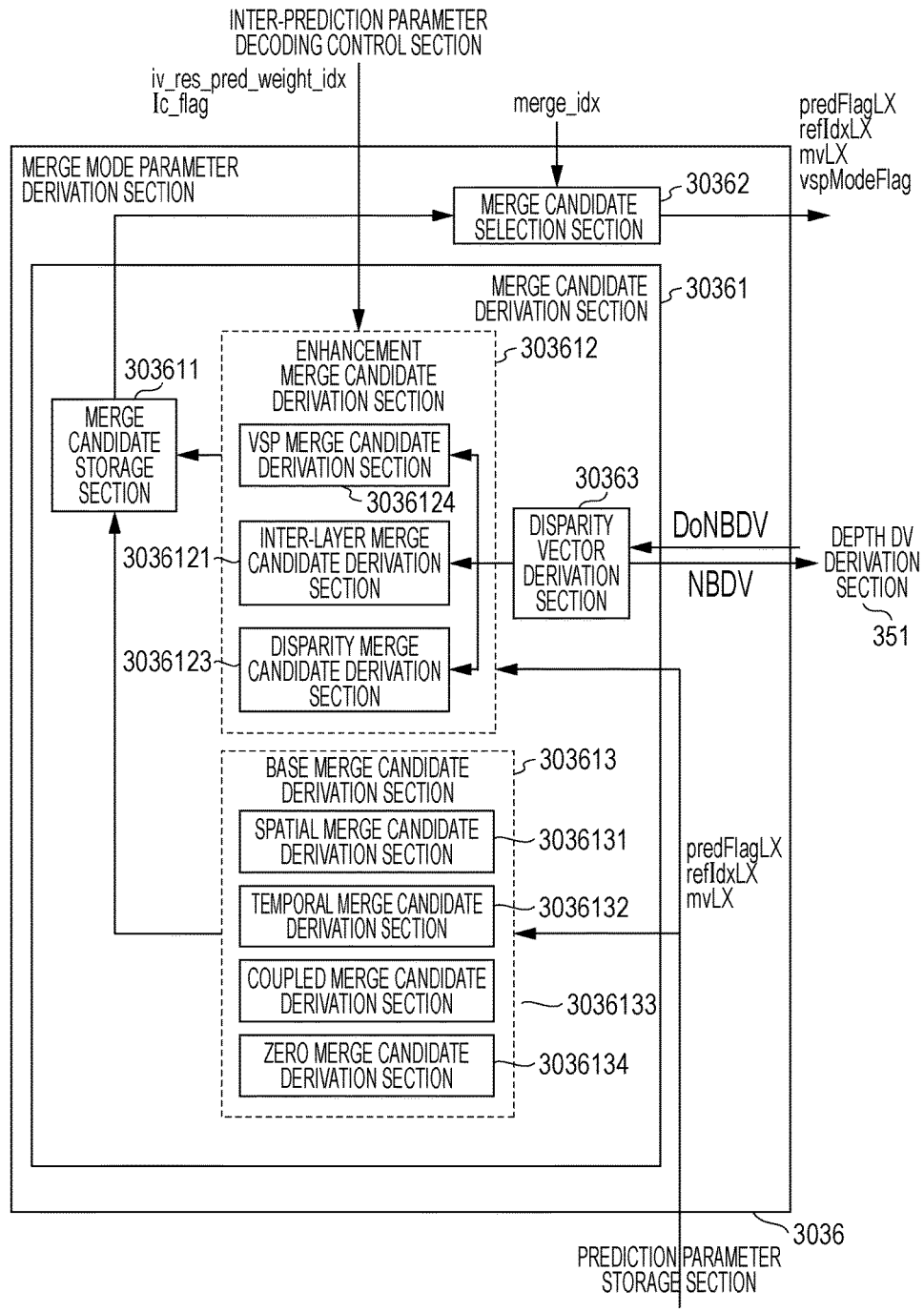
FIG. 7 is a schematic diagram illustrating the configuration of a merge mode parameter derivation section according to the embodiment.

FIG. 7 is a schematic diagram illustrating the configuration of the merge mode parameter derivation section 3036 according to the embodiment. The merge mode parameter derivation section 3036 includes a merge candidate derivation section 30361 and a merge candidate selection section 30362. The merge candidate derivation section 30361 is configured to include a merge candidate storage section 303611, an enhancement merge candidate derivation section 303612, and a base merge candidate derivation section 303613.

The merge candidate storage section 303611 stores merge candidates input from the enhancement merge candidate derivation section 303612 and the base merge candidate derivation section 303613 in the merge candidate list mergeCandList. The merge candidates are configured to include the prediction list use flag predFlagLX, the vector mvLX, the reference picture index refIdxLX, the VSP mode flag VspModeFlag, a disparity vector MvDisp, a layer IDRefViewIdx. In the merge candidate storage section 303611, indexes can be allocated to the merge candidates stored in a merge candidate list mergeCandList according to a predetermined rule.

FIG. 18 is a diagram illustrating an example of the merge candidate list mergeCandList derived from the merge candidate storage section 303611. FIG. 18(a) illustrates the merge candidates derived from the merge candidate storage section 303611 in the base layer (nal_unit_layer=0). In a case where two merge candidates are the same prediction parameter, a spatial merge candidate (A1), a merge index order is an order of a spatial merge candidate (B1), a spatial merge candidate (B0), a spatial merge candidate (A0), and a spatial merge candidate (B2), excluding a process (pruning process) of filling a sequence. Nicknames of the merge candidates are notated in parentheses and the parentheses correspond to the positions of the reference blocks used for the derivation in the case of the spatial merge candidates. After the merge candidates, coupled merge candidates and zero merge candidates are present, but are omitted in FIG. 18. Such merge candidates, that is, the spatial merge candidates, the temporal merge candidates, the coupled merge candidates, and the zero merge candidates are derived from the base merge candidate derivation section 303613. FIG. 18(b) illustrates merge candidates derived from the merge candidate storage section 303611 in an enhancement layer (nal_unit_layer!=0) which is a layer other than the base layer (nal_unit_layer=0). A merge index order is an order of a texture merge candidate (T), an interview merge candidate (IvMC), a spatial merge candidate (A1), a spatial merge candidate (B1), a spatial merge candidate (B0), a disparity merge candidate (IvDC), a VSP merge candidate (VSP), the spatial merge candidate (A0), a spatial merge candidate (B2), a motion shift merge candidate (IvMCShift), a disparity shift merge candidate (IvDCShift), and the time merge candidate (Col). Nicknames of the merge candidates are notated in parentheses. After the merge candidates, coupled merge candidates and zero merge candidates are present, but are omitted in FIG. 18. The texture merge candidate (T), the interview merge candidate (IvMC), the disparity merge candidate (IvDC), the VSP merge candidate (VSP), the motion shift merge candidate (IvMCShift), and the disparity shift merge candidate (IvDCShift) are derived from the enhancement merge candidate derivation section 303612.

Figure 19:
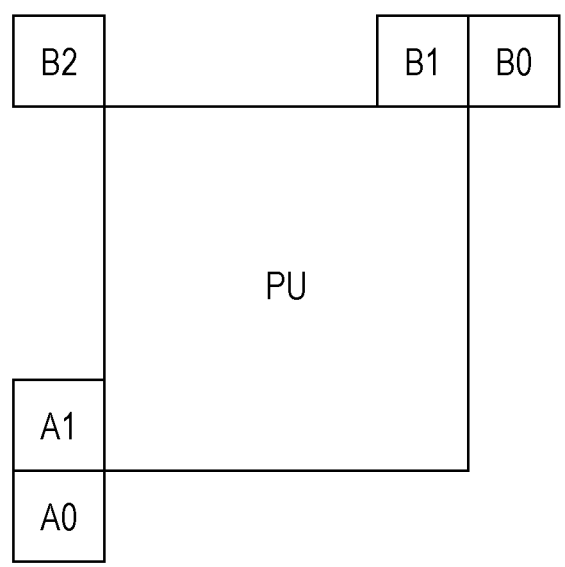
FIG. 19 is a diagram illustrating the positions of adjacent blocks to which spatial merge candidates refer.

FIG. 19 is a diagram illustrating the positions of adjacent blocks to which spatial merge candidates refer. A0, A1, B0, B1, and B2 correspond to positions illustrated in FIG. 19, respectively, and the coordinates thereof are as follows. In a case where the top left coordinates of the prediction unit are xPb and yPb and the width and height of the prediction unit are nPbW and nPbH, the positions of the adjacent blocks are as follows.

A0: (xPb−1, yPb+nPbH)
A1: (xPb−1, yPb+nPbH−1)
B0: (xPb+nPbW, yPb−1)
B1: (xPb+nPbW−1, yPb−1)
B2: (xPb−1, yPb−1)

The enhancement merge candidate derivation section 303612 is configured to include a disparity vector derivation section, an inter-layer merge candidate derivation section 3036121, a disparity merge candidate derivation section 3036123, and a VSP merge candidate derivation section 3036124. The enhancement merge candidates are different merge candidates from base merge candidates to be described below and include at least any of the texture merge candidate (T), the interview merge candidate (IvMC), the disparity merge candidate (IvDC), the VSP merge candidate (VSP), the motion shift merge candidate (IvMCShift), and the disparity shift merge candidate (IvDCShift).

(Texture Merge Candidate)

The inter-layer merge candidate derivation section 3036121 derives the texture merge candidate (T), the interview merge candidate (IvMC), and the motion shift merge candidate (IvMCShift). These merge candidates are derived by selecting a block corresponding to the prediction unit from the reference picture of another layer (for example, the base layer or a base view) having the same POC as the target picture and reading the prediction parameter which is a motion vector included in the block from the prediction parameter memory 307.

The texture merge candidate (T) is derived in the inter-layer merge candidate derivation section 3036121 in a case where the target picture is a depth. The texture merge candidate (T) is derived by specifying the reference block from a depth picture having the same view ID as the target picture and reading a motion vector of the reference block. The coordinates (xRef, yRef) of the reference block is derived from the following formulae in a case where the top left coordinates of the prediction unit are xPb and yPb and the width and height of the prediction unit are nPbW and nPbH.

$$xRefFull = xPb + ((nPbW-1) >> 1)$$

$$yRefFull = yPb + ((nPbH-1) >> 1)$$

$$xRef = Clip3(0, PicWidthInSamplesL-1, (xRefFull >> 3) << 3)$$

$$yRef = Clip3(0, PicHeightInSamplesL-1, (yRefFull >> 3) << 3)$$

PicWidthInSamplesL and PicHeightInSamplesL indicate the width and height of an image, respectively, and the function Clip3 (x, y, z) is a function that restricts (clips) z to x or more and y or less and returns a restricted result.

When a motion vector of the reference block is textMvLX, a motion vector mvLXT of the texture merge candidate is derived by the following formulae. mvLXT[0]=(textMvLX[xRef][yRef][0]+2)>>2

$$mvLXT[1] = (textMvLX[xRef][yRef][1]+2) >> 2$$

In the texture merge candidate, the prediction parameter may be allocated in sub-block units obtained by further splitting the prediction unit.

(Interview Merge Candidate)

The interview merge candidate has the same POC as the target picture specified by the disparity vector derivation section 30363 and is derived in the inter-layer merge candidate derivation section 3036121 by reading the prediction parameter such as a motion vector from the reference block of the picture having a different view ID. The coordinates (xRef, yRef) of the reference block are derived from the following formulae in a case where the top left coordinates are (xPb, yPb) of the prediction unit, the width and height of the prediction unit are nPbW and nPbH, and the disparity vector derived from the disparity vector derivation section 30363 is (mvDisp[0], mvDisp[1]).

$$xREfFull = xPb + (nPbW >> 1) + ((mvDisp[0]+2) >> 2)$$

$$yREfFull = yPb + (nPbH >> 1) + ((mvDisp[1]+2) >> 2)$$

$$xRef = Clip3(0, PicWidthInSampleL-1, (xRefFull >> 3) << 3)$$

$$yRef = Clip3(0, PicHeightInSampleL-1, (yRefFull >> 3) << 3)$$

In the interview merge candidate, the prediction parameter may be allocated in sub-block units obtained by further splitting the prediction unit. For example, in a case where the width and the height of the prediction unit are nPbW and nPbH and the minimum size of the sub-block is SubPbSize, the width nSbW and the height nSbH of the sub-block are derived by the following formulae.

$$nSbW = nPbW/SubPbSize <= 1 ? nPbW : SubPbSize n$$

$$SbH = nPbH/SubPbSize <= 1 ? nPbH : SubPbSize$$

Subsequently, a vector mvLXinterView, a reference picture index refIdxLXinterView, a prediction list use flag availableFlagLXInterView of the interview merge candidate are derived from the vector spMvLX, the reference picture index spRefIdxLX, and the prediction list use flag spPredFlagLX corresponding to the sub-block by the following formulae.

mvLXinterView=spMvLX[xBlk][yBlk]

refIdxLXinterView=spRefIdxLX[xBlk][yBlk]

availableFlagLXinterView=spPredFlagLX[xBlk][yBlk]

xBlk and yBlk are sub-block addresses and have a value from 0 to (nPbW/nSbW−1) and a value from 0 to (nPbH/nSbH−1), respectively.

(Motion Shift Merge Candidate)

The motion shift merge candidate has the same POC as the target picture specified by the disparity vector derivation section 30363 and is derived in the inter-layer merge candidate derivation section 3036121 by reading the prediction parameter such as a motion vector from the reference block of the picture having a different view ID. The coordinates (xRef, yRef) of the reference block are derived from the following formulae in a case where the top left coordinates are (xPb, yPb) of the prediction unit, the width and height of the prediction unit are nPbW and nPbH, and the disparity vector derived from the disparity vector derivation section 30363 is (mvDisp[0], mvDisp[1]).

xRefFull=xPb+(nPbW>>1)+((mvDisp[0]+nPbW*2+4+2)>>2)

yRefFull=yPb+(nPbH>>1)+((mvDisp[1]+nPbH*2+4+2)>>2)

xRef=Clip3(0,PicWidthInSamplesL−1,(xRefFull>>3)<<3)

yRef=Clip3(0,PicHeightInSamplesL−1,(yRefFull>>3)<<3)

(Disparity Merge Candidate)

The disparity merge candidate derivation section 3036123 derives the disparity merge candidate (IvDC) and the shift disparity merge candidate (IvDCShift) from the disparity vector input from the disparity vector derivation section 30363. The disparity merge candidate derivation section 3036123 generates a vector which has a vertical component of 0 and the horizontal component mvDisp[0] of the disparity vector (mvDisp[0], mvDisp[1]) of which the horizontal component is input, as the disparity merge candidate (IvDC), by the following formulae.

mvL0IvDC[0]=DepthFlag? (mvDisp[0]+2)>>2: mvDisp[0]

mvL0IvDC[1]=0

Here, DepthFlag is a variable which is 1 in the case of a depth.

The disparity merge candidate derivation section 3036123 outputs the generated vector and the reference picture index refIdxLX (for example, the index of the base layer image having the same POC as a decoding target picture) of a previous layer image indicated by the disparity vector as merge candidates to the merge candidate storage section 303611.

The disparity merge candidate derivation section 3036123 derives a merge candidate having a vector obtained by shifting the disparity merge candidate in the horizontal direction as the shift disparity merge candidate (IvDC) by the following formula.

mvLXIvDCShift[0]=mvL0IvDC[0]+4 mvLXIvDCShift[1]=mvL0IvDC[1]

(VSP Merge Candidate)

The VSP merge candidate derivation section 3036124 derives a view synthesis prediction (VSP) merge candidate. The VSP merge candidate is a merge candidate that is used in a predicted image generation process by the viewpoint synthesis prediction executed by a viewpoint synthesis prediction section 3094. The VSP merge candidate derivation section 3036124 derives the prediction parameters by setting the disparity vector mvDisp input from the disparity vector derivation section 30363 in the vector mvLX, setting the reference picture index and the view ID of the reference picture specified by the disparity vector derivation section 30363 in the reference picture index refIdxLX and the view ID refViewIdx, and setting 1 in the VSP mode flag VspModeFlag, and then derives the VSP merge candidate. The VSP merge candidate derivation section 3036124 outputs the derived VSP merge candidate to the merge candidate storage section 303611.

The VSP merge candidate derivation section 3036124 receives the residual prediction weight index iv_res_pred_weight_idx and the illuminance compensation flag ic_flag as inputs from the inter-prediction parameter decoding control section. The VSP merge candidate derivation section 3036124 executes the process of deriving the VSP merge candidate only in a case where the residual prediction weight index iv_res_pred_weight_idx is 0 and the illuminance compensation flag ic_flag is 0. That is, only in the case where the residual prediction weight index iv_res_pred_weight_idx is 0 and the illuminance compensation flag ic_flag is 0, the VSP merge candidate is added to the components of the merge candidate list mergeCandList. In contrast, in a case where the residual prediction weight index iv_res_pred_weight_idx is a value other than 0 or the illuminance compensation flag ic_flag is a value other than 0, the VSP merge candidate derivation section 3036124 does not add the VSP merge candidate to the components of the merge candidate list mergeCandList.

The base merge candidate derivation section 303613 is configured to include a spatial merge candidate derivation section 3036131, a temporal merge candidate derivation section 3036132, a coupled merge candidate derivation section 3036133, and a zero merge candidate derivation section 3036134. Base merge candidates are merge candidates used in the base layer, that is, merge candidates used in an HEVC (for example, an HEVC main profile) rather than scalable, and include at least either a spatial merge candidate or a temporal merge candidate.

The spatial merge candidate derivation section 3036131 reads the prediction parameters (the prediction list use flag predFlagLX, the vector mvLX, and the reference picture index refIdxLX) stored by the prediction parameter memory 307 according to a predetermined rule and derives the read prediction parameters as merge candidates. The read prediction parameters are prediction parameters related to adjacent blocks which are blocks present within a pre-decided range from the prediction unit (for example, some or all of the blocks adjacent to the bottom left end, the top left end, and the top right end of the prediction unit). The derived spatial merge candidates are stored in the merge candidate storage section 303611.

In the spatial merge candidate derivation section 3036131, VSP mode flags mergeCandIsVspFlag of the merge candidates derived in succession to the VSP mode flags VspModeFlag of the adjacent blocks are set. That is, in a case where the VSP mode flag VspModeFlag of the adjacent block is 1, the VSP mode flag mergeCandIsVspFlag of the corresponding spatial merge candidate is set to 1. In other cases, the VSP mode flag mergeCandIsVspFlag is set to 0.

Hereinafter, the VSP mode flag VspModeFlag is set to 0 in the merge candidates derived from the temporal merge candidate derivation section 3036132, the coupled merge candidate derivation section 3036133, and the zero merge candidate derivation section 3036134.

The temporal merge candidate derivation section 3036132 reads the prediction parameter of the block in the reference image including the coordinates of the bottom right of the prediction unit from the prediction parameter memory 307 and sets the read prediction parameter as a merge candidate. As a method of designating the reference image, for example, a co-located picture col_ref_idx designated with a slice header and the reference picture index refIdxLX designated with RefPicListX[col_ref_idx] designated from the reference picture list RefPicListX may be used. The derived merge candidate is stored in the merge candidate storage section 303611.

The coupled merge candidate derivation section 3036133 derives coupled merge candidates by combining the vectors of two different derived merge candidates already derived and stored in the merge candidate storage section 303611 with the reference picture indexes and setting the combined vectors as vectors of L0 and L1. The derived merge candidates are stored in the merge candidate storage section 303611.

The zero merge candidate derivation section 3036134 derives a merge candidate of which the reference picture index refIdxLX is i and both of the X and Y components of the vector mvLX are 0 until the number of derived merge candidates reaches a maximum value. The value of 1 indicating the reference picture index refIdxLX is allocated in order from 0. The derived merge candidate is stored in the merge candidate storage section 303611.

The merge candidate selection section 30362 selects, as an inter-prediction parameter of the target PU, the merge candidate to which the index corresponding to the merge index merge_idx input from the inter-prediction parameter decoding control section 3031 among the merge candidates stored in the merge candidate storage section 303611 is allocated. That is, when the merge candidate list is mergeCandList, the prediction parameter denoted by mergeCandList[merge_idx] is selected. The merge candidate selection section 30362 stores the selected merge candidate in the prediction parameter memory 307 (see FIG. 5) and outputs the selected merge candidate to the predicted image generation section 308 (see FIG. 5).

predSamplesLX'[x] [y]=predSamplesLX[x] [y]

Figure 22:
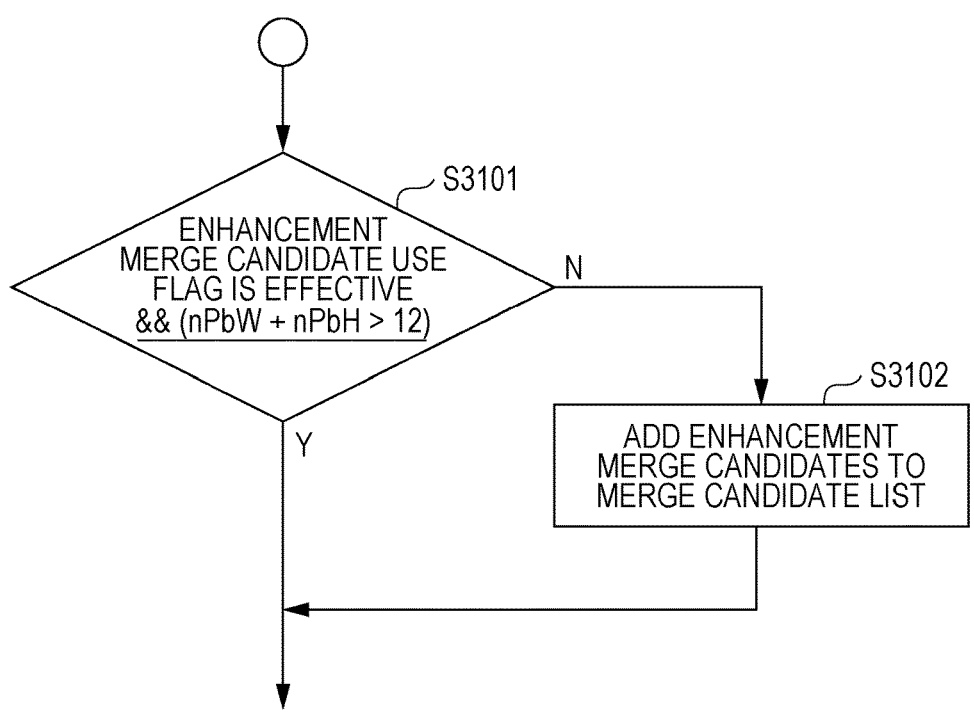
FIG. 22 is a diagram illustrating individual operations of a merge candidate derivation section 30361A according to the embodiment.

FIG. 22 is a diagram illustrating an individual operation of a merge candidate derivation section 30361 according to the embodiment. The merge candidate derivation section 30361 according to the embodiment derives the texture merge candidate (T), the interview merge candidate (IvMC), the spatial merge candidate (A1), the spatial merge candidate (B1), the spatial merge candidate (B0), the disparity merge candidate (IvDC), the VSP merge candidate (VSP), the spatial merge candidate (A0), the spatial merge candidate (B2), the motion shift merge candidate (IvMCShift), the disparity shift merge candidate (IvDCShift), and the time merge candidate (Col), as described above, and stores them as a merge candidate list in the merge candidate storage section 303611. FIG. 22 is a diagram illustrating a process of adding merge candidates to a merge candidate list extMergeCandList[ ] according to availability availableFlagN (where N is any of T, A1, B1, IvDC, VSP, B1, B0, IvDC, VSP, A0, B2, IvMCShift, IvDCShift, and Col) of each merge candidate N in the merge candidate derivation section 30361. In the merge candidate derivation section 30361 according to the embodiment, the enhancement merge candidate is not stored in the merge candidate list in a case where (S3101) the size of a prediction block is equal to or less than a predetermined size (here, a case of nPbW+nPbH==12). The enhancement merge candidate is stored in the merge candidate list in a case where (S3102) the size of the prediction block is greater than the predetermined size. Here, the enhancement merge candidate is a merge candidate additionally derived in an enhancement layer and is one or all of the texture merge candidate (T), the interview merge candidate (IvMC), the disparity merge candidate (IvDC), the VSP merge candidate (VSP), the motion shift merge candidate (IvMCShift), and the disparity shift merge candidate (IvDCShift).

FIG. 23 is a diagram illustrating all of the operations of the merge candidate derivation section 30361 according to the embodiment. As illustrated in FIG. 23, the merge candidate derivation section 30361 executes the operation described in FIG. 22 in the storing of each merge candidate by executing the following processes in order.

In a case where the texture merge candidate is available (where availableFlagT is 1) and the prediction block has a size greater than a predetermined size, the texture merge candidate (T) is stored in the merge candidate list (S3201).

In a case where the interview merge candidate (IvMC) is available (where availableFlagIvMC is 1) and the texture merge candidate is unavailable (where availableFlagT is 0), or the texture merge candidate and the interview merge candidate have different prediction parameters (differentMotion(T, IvMC)) and the prediction block has a size greater than the predetermined size, the interview merge candidate (Iv) is stored in the merge candidate list (S3202).

In a case where the spatial merge candidate (A1) is available (where availableFlagA1 is 1) and the merge candidate of N is unavailable (where availableFlagN is 0), or the spatial merge candidate (A1) and the merge candidate of N have different prediction parameters (differentMotion(N, A1)) and the prediction block has the size greater than the predetermined size, the spatial merge candidate (A1) is stored in the merge candidate list (S3203).

Hereinafter, in a case where the depth flag DepthFlag is 1, the texture merge candidate (T) is set in N. In other cases, the interview merge candidate (IvMC) is set in N.

The spatial merge candidate (B1) is available (where availableFlagB1 is 1) and the merge candidate of N is unavailable (where availableFlagN is 0), or the spatial merge candidate (B1) and the merge candidate of N have different prediction parameters (differentMotion (N, B1)) and the spatial merge candidate (B1) is stored in the merge candidate list (S3204).103).

In a case where the spatial merge candidate (B0) is available (where availableFlagB0 is 1), the spatial merge candidate (B1) is stored in the merge candidate list (S3205).

In a case where the disparity merge candidate (IvDC) is available (where availableFlagIvDC is 1) and the merge candidate of A1 is unavailable (availableFlagA1 is 0), disparity merge candidate (IvDC) and the merge candidate of A1 the have different prediction parameters (differentMotion(A1, IvDC)) and the merge candidate of B1 is unavailable (where availableFlagB1 is 0), or the disparity merge candidate (IvDC) and the merge candidate of B1 have different prediction parameters (differentMotion(B1, IvDC)) and the prediction block has a size greater than the predetermined size, the disparity marge candidate (IvDC) is stored in the merge candidate list (S3206).

In a case where the VSP merge candidate (VSP) is available (where availableFlagVSP is 1), the illuminance compensation flag is 0, the residual prediction weight index is 0, and the prediction block has a size greater than the predetermined size, the disparity merge candidate (VSP) is stored in the merge candidate list (S3207).

In a case where the spatial merge candidate (A0) is available (where availableFlagA0 is 1), the spatial merge candidate (A0) is stored in the merge candidate list (S3208).

In a case where the spatial merge candidate (B2) is available (where availableFlagB2 is 1), the spatial merge candidate (B2) is stored in the merge candidate list (S3209).

In a case where the shift motion merge candidate (IvMC-Shift) is available (where availableFlagIvMCShift is 1) and the interview merge candidate is unavailable (where availableFlagIvMC is 0) or the merge candidate of IvMC and the shift motion merge candidate (IvMCShift) have different prediction parameters (differentMotion(IvMC, IvMCShift)) and the prediction block has a size greater than the predetermined size, the shift motion merge candidate (IvMCShift) is stored in the merge candidate list (S3210).

In a case where the shift disparity merge candidate (IvDCShift) is available (where availableFlagIvDCShift is 1) and the prediction block has a size greater than the predetermined size, the shift disparity merge candidate (IvDCShift) is stored in the merge candidate list (S3211).

As described above, a merge candidate derivation section 30361B stores the enhancement merge candidates in the merge candidate list according to the size of the prediction block.

In the embodiment, the sum of the width and the height of the prediction unit has been used as the size of the prediction unit, but the width of the prediction unit, the height of the prediction unit, a minimum value of the width and the height, or a product of the width and the height may be used. For example, in a case where both of the width and the height of the prediction block are 8 or more, the size is preferably determined to be greater than the predetermined size. In a case where both of the width and the height of the prediction block are less than 8, the size is preferably determined to be less than the predetermined size (the same applies below).

Through the above-described processes, the merge candidate derivation section 30361 includes the enhancement merge candidate in the merge candidate list only in the case where the sum of the width of the prediction unit and the height of the prediction unit is greater than 12. That is, in the case where the sum of the width and the height of the prediction unit is equal to or less than 12, (the case where the sum of the width and the height of the prediction unit are 12), the enhancement merge candidate is not included in the merge candidate list. Similarly, only in a case where both of the width and the height of the prediction unit are equal to or greater than 8, the merge candidate derivation section 30361 includes the enhancement merge candidate in the merge candidate list. That is, in a case where both of the width and the height of the prediction unit are less than 8, the enhancement merge candidate is not included in the merge candidate list (a modification example of the merge candidate derivation section 30361).

Hereinafter, the merge candidate derivation section 30361B which is a modification example of the merge candidate derivation section 30361 will be described. In the foregoing merge candidate derivation section 30361, the enhancement merge candidate is derived in the case where an available flag of the merge candidate is 1 and the prediction unit has a size greater than the predetermined size. In the following modification example, however, in a case where the prediction unit has a size equal to or less than the predetermined size, the available flag of the enhancement merge candidate is set to 0.

Figure 24:
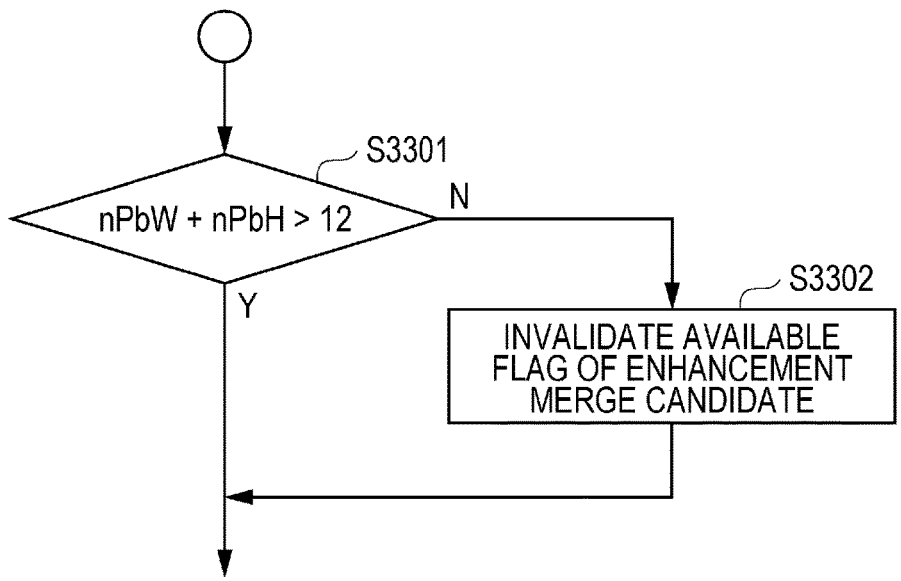
FIG. 24 is a diagram illustrating an operation of a merge candidate derivation section 30361B according to the embodiment.

FIG. 24(*a*) is a flowchart illustrating an operation of the merge candidate derivation section 30361B. As illustrated in FIG. 24(*a*), in a case where (S3301) the prediction unit has a size equal to or less than the predetermined size (here, a case of nPbW+nPbH==12), (S3302) the available flag of the enhancement merge candidate is invalidated.

FIG. 24(*b*) is a diagram illustrating all of the processes of the merge candidate derivation section 30361B. As illustrated in FIG. 24(*b*), in the case where the prediction unit has a size equal to or less than the predetermined size (here, the case of nPbW+nPbH==12), that is, the case where (nPbW+nPbH>12) is 0, 0 which is a value indicating unavailability is set in the available flags of the enhancement merge candidates, herein, the available flag availableFlagT of the texture merge candidate, the available flag availableFlagIvMC of the interview candidate, the available flag availableFlagIvDC of the disparity merge candidate, the available flag availableFlagIvMCShift of the shift motion merge candidate, the available flag availableFlagIvDCShift of the shift disparity merge candidate. The following formula indicates that the available flag availableFlagN of the merge candidate of N is set to 0 in cases other than a case where the size of the prediction block is greater than the predetermined size (nPbW+nPbH>12).

availableFlag$N$&=($nPbW$+$nPbH$>12)

That is, in the case where the sum of the width and the height of the prediction block is equal to or less than 12, the enhancement merge candidate is derived on the assumption that the availability is not used in the available flag availableFlagN of the enhancement merge candidate. In a case where the minimum size of the prediction block is 4×8 or 8×4, that is, a case where both of the width and the height of the prediction unit are equal to or greater than 8 and a case where the sum of the width and the height of the prediction block is 12, the enhancement merge candidate may be derived on the assumption that the availability is not used in the available flag availableFlagN of the enhancement merge candidate. In a case where neither the width nor the height of the prediction unit is equal to or greater than 8 (at least one of the width and the height of the prediction unit is less than 8), the enhancement merge candidate may be derived on the assumption that the availability is not used in the available flag availableFlagN of the enhancement merge candidate.

Through the foregoing processes, the merge candidate derivation section 30361B includes the enhancement merge candidate in the merge candidate list only in the case where the sum of the width of the prediction unit and the height of the prediction unit is greater than 12. That is, the enhancement merge candidate is not included in the merge candidate list in the case where the sum of the width and the height of the prediction unit is equal to or less than 12 (the case where the sum of the width and the height of the prediction unit is 12). Similarly, only in the case where the both of the width and the height of the prediction unit are equal to or greater than 8, the merge candidate derivation section 30361B includes the enhancement merge candidate in the merge candidate list. That is, in the case where the width and the height of the prediction unit is less than 8, the enhancement merge candidate is not included in the merge candidate list.

FIG. 25 is a diagram illustrating an operation of the merge candidate derivation section 30361B after the available flag of the enhancement merge candidate is set according to the size of the prediction unit. The whole flow is the same as that described in FIG. 23. In the modification example, the size of the prediction unit has already been determined in the available flag. Therefore, in a case where the enhancement merge candidate is added to the merge candidate list, the determination of the size of the prediction unit is not explicitly asserted.

FIG. 23 is a diagram illustrating all of the operations of a merge candidate derivation section 30361 according to the embodiment. As illustrated in FIG. 23, the merge candidate derivation section 30361 executes the operation described in FIG. 22 in the storing of each merge candidate by executing the following processes in order.

In a case where the texture merge candidate is available (where availableFlagT is 1), the texture merge candidate (T) is stored in the merge candidate list (S3401).

In a case where the interview merge candidate (IvMC) is available (where availableFlagIvMC is 1) and the texture merge candidate is unavailable (where availableFlagT is 0), or the texture merge candidate and the interview merge candidate have different prediction parameters (differentMotion(T, IvMC)), the interview merge candidate (Iv) is stored in the merge candidate list (S3402).

In a case where the spatial merge candidate (A1) is available (where availableFlagA1 is 1) and the merge candidate of N is unavailable (where availableFlagN is 0), or the spatial merge candidate (A1) and the merge candidate of N have different prediction parameters (differentMotion(N, A1)), the spatial merge candidate (A1) is stored in the merge candidate list (S3403).

Hereinafter, in a case where the DepthFlag is 1, the texture merge candidate (T) is set in N. In other cases, the interview merge candidate (IvMC) is set in N.

In a case where the spatial merge candidate (B1) is available (where availableFlagB1 is 1) and the merge candidate of N is unavailable (where availableFlagN is 0), or the spatial merge candidate (B1) and the merge candidate of N have different prediction parameters (differentMotion(N, B1)), the spatial merge candidate (B1) is stored in the merge candidate list (S3404). 103).

In a case where the spatial merge candidate (B0) is available (where availableFlagB0 is 1), the spatial merge candidate (B1) is stored in the merge candidate list (S3405).

In a case where the disparity merge candidate (IvDC) is available (where availableFlagIvDC is 1) and the merge candidate of A1 is unavailable (availableFlagA1 is 0), disparity merge candidate (IvDC) and the merge candidate of A1 have the different prediction parameters (differentMotion(A1, IvDC)) and the merge candidate of B1 is unavailable (where availableFlagB1 is 0), or the disparity merge candidate (IvDC) and the merge candidate of B1 have different prediction parameters (differentMotion(B1, IvDC)), the disparity merge candidate (IvDC) is stored in the merge candidate list (S3406).

In a case where the VSP merge candidate (VSP) is available (where availableFlagVSP is 1), the illuminance compensation flag is 0, the residual prediction weight index is 0, the disparity merge candidate (VSP) is stored in the merge candidate list (S3407).

In a case where the spatial merge candidate (A0) is available (where availableFlagA0 is 1), the spatial merge candidate (A0) is stored in the merge candidate list (S3408).

In a case where the spatial merge candidate (B2) is available (where availableFlagB2 is 1), the spatial merge candidate (B2) is stored in the merge candidate list (S3409).

In a case where the shift motion merge candidate (IvMCShift) is available (where availableFlagIvMCShift is 1) and the interview merge candidate is unavailable (where availableFlagIvMC is 0) or the merge candidate of IvMC and the shift motion merge candidate (IvMCShift) have different prediction parameters (differentMotion(IvMC, IvMCShift)), the shift motion merge candidate (IvMCShift) is stored in the merge candidate list (S3410).

In a case where the shift disparity merge candidate (IvDCShift) is available (where availableFlagIvDCShift is 1), the shift disparity merge candidate (IvDCShift) is stored in the merge candidate list (S3411).

As described above, a merge candidate derivation section 30361C derives the availability of the enhancement merge candidates according to the size of the prediction block.

(Another Modification Example of The Merge Candidate Derivation Section 30361)

Hereinafter, the merge candidate derivation section 30361C which is another modification example of the merge candidate derivation section 30361 will be described. In the other modification example of the merge candidate derivation section 30361, a merge candidate list extMergeCandList is derived using a merge candidate list baseMergeCandList formed by base merge candidates derived from the base merge candidate derivation section 303613 (including no enhancement merge candidate).

Figure 26:
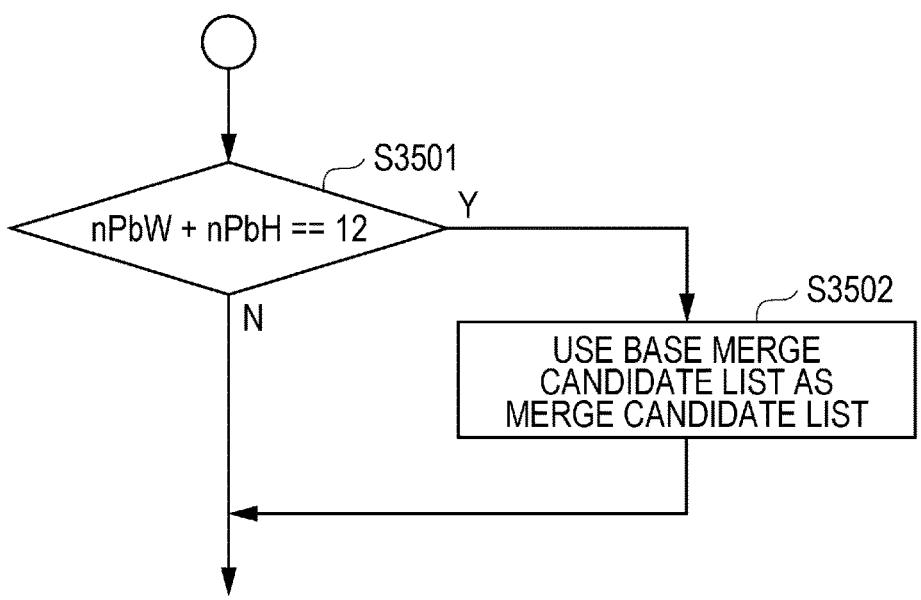
FIG. 26 is a diagram illustrating an operation of a merge candidate derivation section 30361C according to the embodiment.

FIG. 26(a) is a flowchart illustrating an operation of the merge candidate derivation section 30361C. As illustrated in FIG. 26(a), in a case where (S3501) the prediction unit has a size equal to or less than the predetermined size (here, a case of nPbW+nPbH==12), (S3502) the base merge candidate list is used as the merge candidate list.

FIG. 26(b) is a diagram illustrating an operation of the merge candidate derivation section 30361C. In the case where the prediction unit has a size equal to or less than the predetermined size (here, the case of nPbW+nPbH==12), the merge candidate derivation section 30361C uses the base merge candidate list baseMergeCandList as the merge candidate list extMergeCandList. Specifically, after the merge candidate list extMergeCandList is derived through the operation illustrated in FIG. 25, the merge candidate may be substituted with the base merge candidate through the operation of FIG. 26(b). In the case where the prediction unit has a size equal to or less than the predetermined size (here, the case of nPbW+nPbH==12), the merge candidate list extMergeCandList may be derived through the operation illustrated in FIG. 26(b). In the case where the prediction unit has a size greater than the predetermined size, the merge candidate list extMergeCandList may be derived through the operation illustrated in FIG. 25.

The case where the sum of the width and the height of the prediction block is not equal to or less than 12 is equivalent to the case where both of the width and the height of the prediction unit are equal to or greater than 8 (the case where at least one of the width and the height of the prediction unit is less than 8). Accordingly, in the case where at least one of the width and the height of the prediction unit is less than 8, only the base merge candidate list may be derived as the merge candidate list extMergeCandList. Through the foregoing process, the merge candidate derivation section 30361C includes the enhancement merge candidate in the merge candidate list only in the case where the sum of the width and the height of the prediction unit is equal to or greater than 12. That is, in the case where the sum of the width and the height of the prediction unit is equal to or less than 12 (the case where the sum of the width and the height of the prediction unit is 12), the enhancement merge candidate is not included in the merge candidate list. Similarly, the merge candidate derivation section 30361C includes the enhancement merge candidate in the merge candidate list only in the case where both of the width and the height of the prediction unit are equal to or greater than 8. That is, in the case where the width or the height of the prediction unit is less than 8, the enhancement merge candidate is not included in the merge candidate list.

As described above, the merge candidate derivation section 30361C stores only the base merge candidate list as the merge candidate list according to the size of the prediction block.

The merge candidate derivation section 30361, the merge candidate derivation section 30361B, and the merge candidate derivation section 30361C described above do not store the enhancement merge candidate in the merge candidate list in the case where the prediction unit has a size equal to or less than the predetermined size. In the case where the prediction unit has a size equal to or less than the predetermined size, it is not necessary to derive the enhancement merge candidate. Therefore, there is the advantage of simplifying the process of deriving the merge candidate. In particular, in the case where the size of the prediction unit is 8×4 or 4×8 (the case of nPbW+nPbH==12), the size of the prediction unit is the minimum value and it is necessary to derive the merge candidate in regard to many prediction units. Accordingly, by not using the enhancement merge candidate in the case where the block size is small, there is the advantage of reducing a processing amount of a worst case in which the derivation of the merge candidate is in a bottleneck.

(Another Modification Example of Merge Mode Parameter Derivation Section 3036)

Hereinafter, a merge mode parameter derivation section 3036D will be described as another modification example of the merge mode parameter derivation section 3036. The merge mode parameter derivation section 3036 includes any one of the merge candidate derivation section 30361, the merge candidate derivation section 30361B, and the merge candidate derivation section 30361C described above. In the case where the prediction unit has a size equal to or less than the predetermined size, the enhancement merge candidate is not stored in the merge candidate list.

The merge mode parameter derivation section 3036D does not succeed the VSP mode flag from the adjacent block further in the case where the prediction unit has a size equal to or less than the predetermined size in the spatial merge candidate. That is, in the case where the prediction unit has a size equal to or greater than the predetermined size in the spatial merge candidate, the merge mode parameter derivation section 3036D also sets the VSP mode flag mergeCandIsVspFlag of the corresponding spatial merge candidate to 1 when the VSP mode flag is 1 in the referred block. However, in the case where the prediction unit has a size equal to or less than the predetermined size, the VSP mode flag mergeCandIsVspFlag of the corresponding spatial merge candidate is normally set to 0.

FIG. 27 is a diagram illustrating an operation of the merge mode parameter derivation section 3036D. FIG. 27 illustrates an operation of deriving the VSP mode flag vspModeFlag of the merge mode from the VSP mode flag mergeCandIsVspFlag of the merge candidate. As illustrated in FIG. 27, only in the case where the prediction unit has a size equal to or greater than the predetermined size (here, the case where the sum of the width and the height of the PU is greater than 12), the VSP mode flag vspModeFlag is set according to the VSP mode flag mergeCandIsVspFlag of the referred merge candidate. In other cases, the VSP mode flag mergeCandIsVspFlag is set to 0. In a case where the VSP mode flag mergeCandIsVspFlag of the referred merge candidate is 1 and the case where the prediction unit has a size equal to or greater than the predetermined size, the VSP mode flag VspModeFlag is set to 1. In other cases, the VSP mode flag VspModeFlag is set to 0. In the example of FIG. 27, even in a case where the illuminance flag ic_flag and the residual prediction weight index iv_res_pred_weight_idx is a value other than 0, the VSP mode flag vspModeFlag is set to 0. However, such addition determination may not be executed.

The operation of referring to the VSP mode flag mergeCandIsVspFlag of the merge candidate referred to according to the prediction unit may be executed by the spatial merge candidate derivation section 3036131D. In this case, in the case where the prediction block has a size greater than the predetermined size, the spatial merge candidate derivation section 3036131D succeeds the VSP mode flag VspModeFlag of the adjacent block and the VSP mode flag mergeCandIsVspFlag of the merge candidate. That is, in the case where the VSP mode flag VspModeFlag of the adjacent block is 1, the VSP mode flag mergeCandIsVspFlag of the corresponding spatial merge candidate is set to 1. In other cases, the VSP mode flag mergeCandIsVspFlag is set to 0. In the case where the prediction block has a size equal to or less than the predetermined size, the spatial merge candidate derivation section 3036131D sets to the VSP mode flag mergeCandIsVspFlag of the corresponding spatial merge candidate to 0.

In the merge mode parameter derivation section 3036D and the spatial merge candidate derivation section 3036131D described above, it is not necessary refer to the VSP mode flag VspModeFlag of the adjacent block in the case where the prediction unit has a size equal to or less than the predetermined size. Therefore, there is the advantage of easily deriving the merge candidate.

Figure 8:
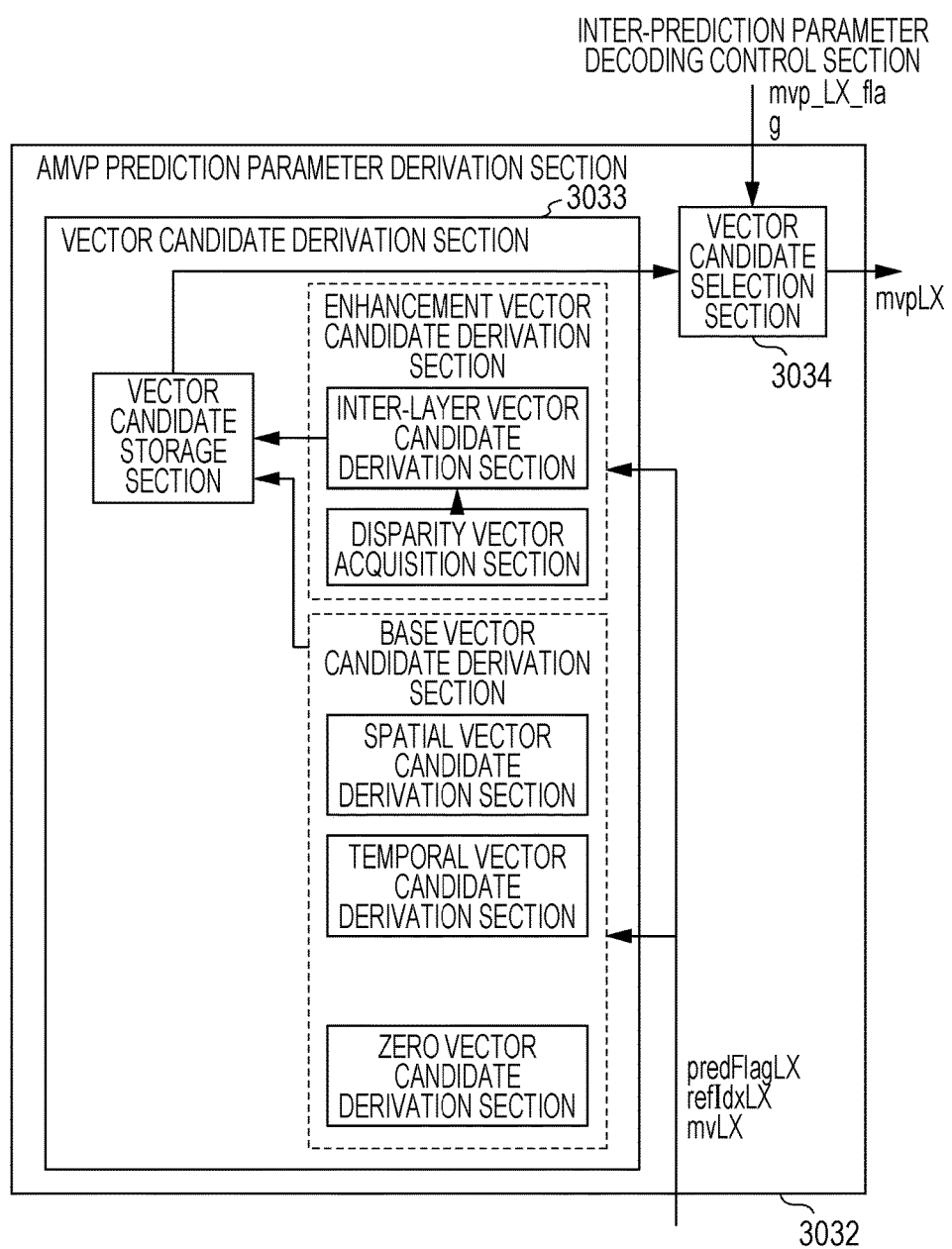
FIG. 8 is a schematic diagram illustrating the configuration of an AMVP prediction parameter derivation section according to the embodiment.

FIG. 8 is a schematic diagram illustrating the configuration of the AMVP prediction parameter derivation section 3032 according to the embodiment. The AMVP prediction parameter derivation section 3032 includes a vector candidate derivation section 3033 and a prediction vector selection section 3034. The vector candidate derivation section 3033 reads the vectors stored by the prediction parameter memory 307 (see FIG. 5) based on the reference picture indexes refIdx and generates the vector candidate list mvpListLX. The reference blocks are blocks located at pre-decided positions using the position of the prediction unit as a standard (for example, blocks temporally adjacent to the bottom left end and the top right end of the prediction unit).

The prediction vector selection section 3034 selects, as the prediction vector mvpLX, the vector mvpListLX[mvp_lX_flag] indicated by the prediction vector flag mvp_LX_flag input from the inter-prediction parameter decoding control section 3031 among the vector candidates mvpListLX derived from the vector candidate derivation section 3033. The prediction vector selection section 3034 outputs the selected prediction vector mvpLX to the addition section 3035.

The addition section 3035 adds the prediction vector mvpLX input from the prediction vector selection section 3034 and the difference vector mvdLX input from the inter-prediction parameter decoding control section to calculate the vector mvLX. The addition section 3035 outputs the calculated vector mvLX to the predicted image generation section 308 (see FIG. 5).

Figure 10:
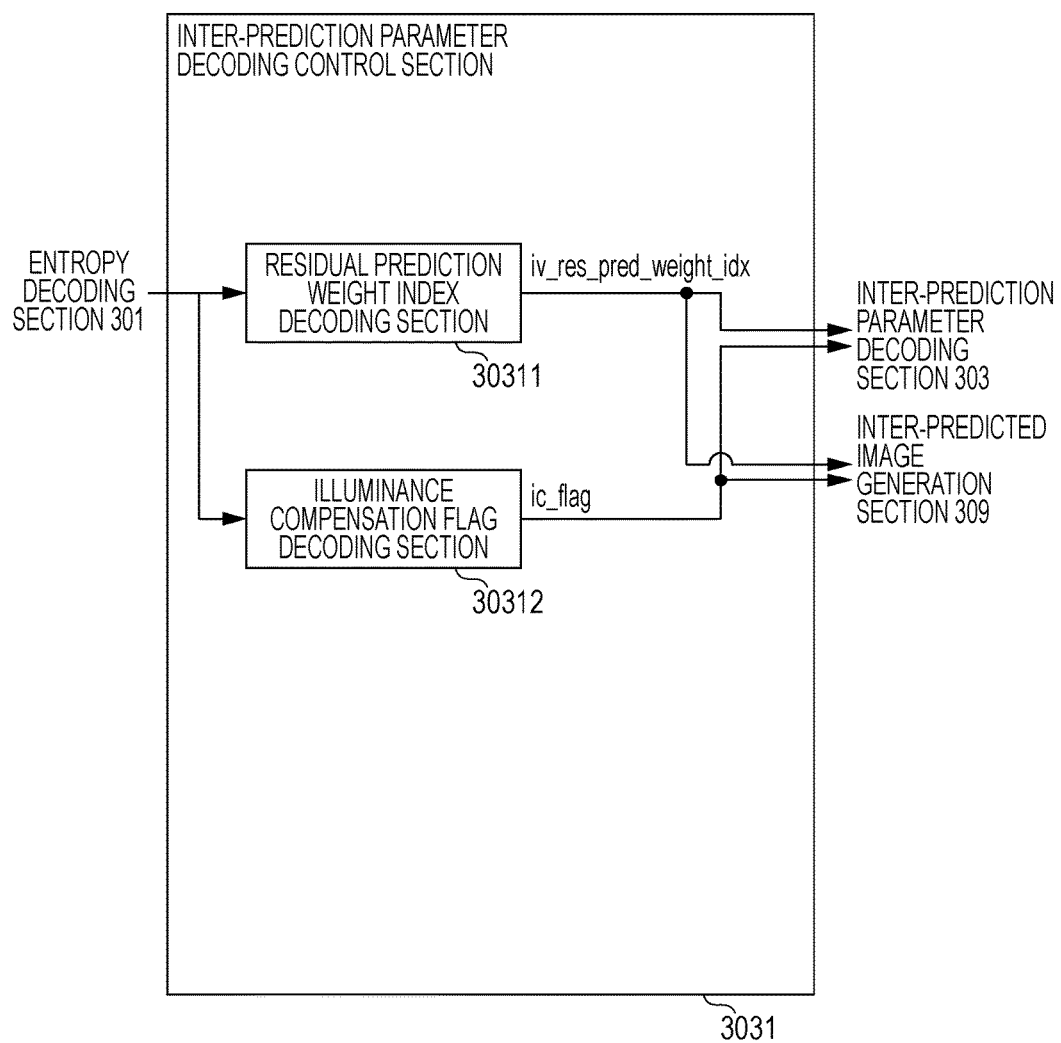
FIG. 10 is a schematic diagram illustrating the configuration of an inter-prediction parameter decoding control decoding section according to the embodiment.

FIG. 10 is a block diagram illustrating the configuration of the inter-prediction parameter decoding control section 3031 according to the first embodiment. As illustrated in FIG. 10, the inter-prediction parameter decoding control section 3031 is configured to include a residual prediction weight index decoding section 30311, and an illuminance compensation flag decoding section 30312 and include a splitting mode decoding section, a merge flag decoding section, a merge index decoding section, an inter-prediction flag decoding section, a reference picture index decoding section, a vector candidate index decoding section, and a vector difference decoding section (none of which is illustrated). The splitting mode decoding section, the merge flag decoding section, the merge index decoding section, the inter-prediction flag decoding section, the reference picture index decoding section, the vector candidate index decoding section, and the vector difference decoding section decode the splitting mode part_mode, the merge flag merge_flag, the merge index merge_idx, the inter-prediction flag inter_pred_idc, the reference picture index refIdxLX, a prediction vector flag mvp_LX_flag, and the difference vector mvdLX.

The residual prediction weight index decoding section 30311 (residual prediction flag decoding section) decodes the residual prediction weight index iv_res_pred_weight_idx from the coded data using the entropy decoding section 301 in a case where the splitting mode of the coding unit CU PartMode (part_mode) is 2N×2N. In other cases, the residual prediction weight index decoding section 30311 sets (infers) the residual prediction weight index iv_res_pred_weight_idx to 0. The residual prediction weight index decoding section 30311 outputs the decoded residual prediction weight index iv_res_pred_weight_idx to the merge mode parameter derivation section 3036 and the inter-predicted image generation section 309.

The illuminance compensation flag decoding section 30312 decodes the illuminance compensation flag ic_flag from the code data using the entropy decoding section 301 in the case where the prediction block size PartMode is 2N×2N. In other cases, the illuminance compensation flag decoding section 30312 sets (infers) 0 in iv_res_pred_weight_idx. The illuminance compensation flag decoding section 30312 outputs the decoded illuminance compensation flag ic_flag to the merge mode parameter derivation section 3036 and the inter-predicted image generation section 309.

(Inter-prediction Image Generation Section 309)

Figure 11:
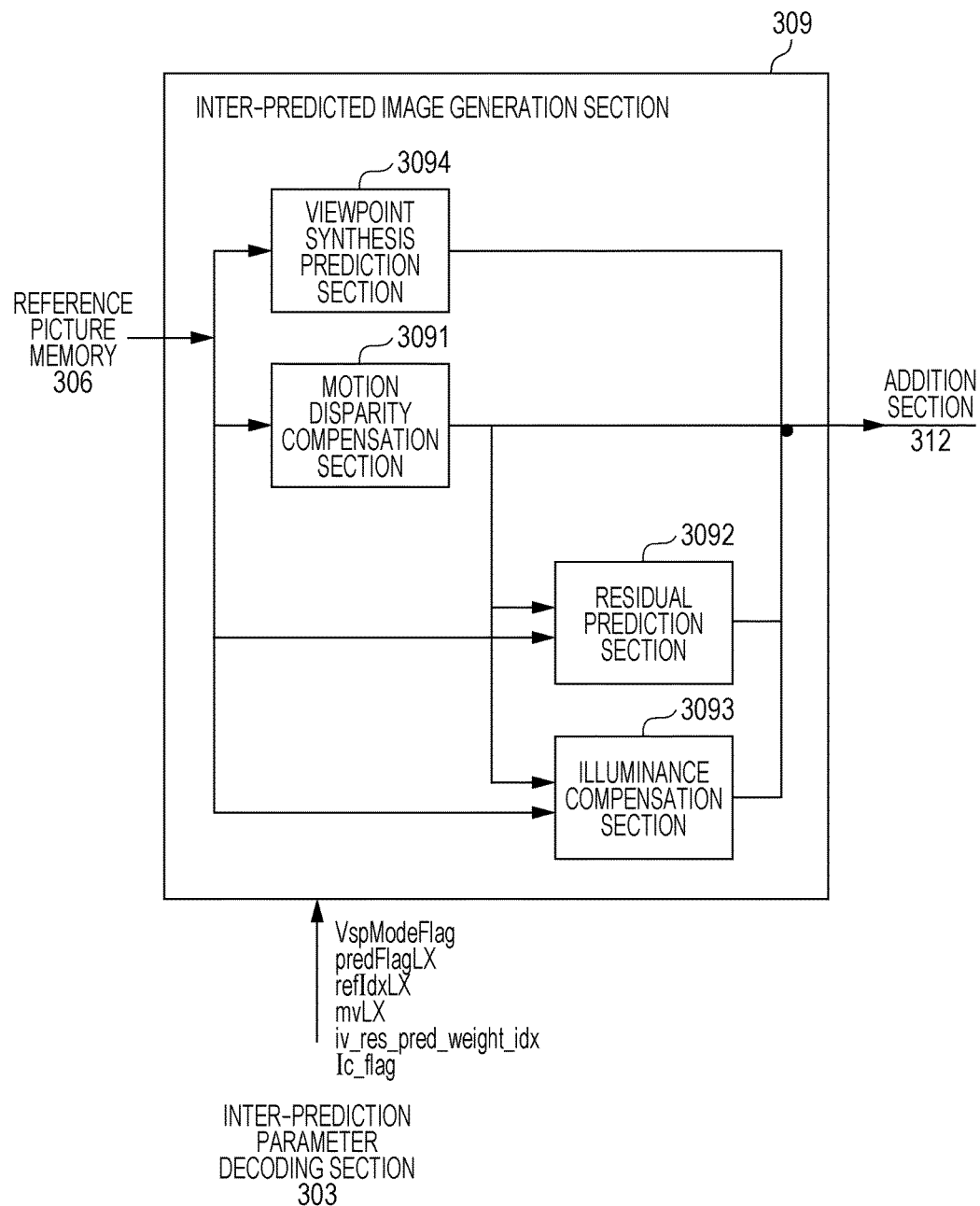
FIG. 11 is a schematic diagram illustrating the configuration of an inter-prediction image generation section according to the embodiment.

FIG. 11 is a schematic diagram illustrating the configuration of the VSP merge candidate derivation section 3036124 according to the embodiment. The inter-predicted image generation section 309 is configured to include a motion disparity compensation section 3091, a residual prediction section 3092, an illuminance compensation section 3093, and the viewpoint synthesis prediction section 3094.

The inter-predicted image generation section 309 inputs the VSP mode flag VspModeFlag and the prediction parameters from the inter-prediction parameter decoding section 303. The inter-predicted image generation section 309 outputs the prediction parameter to the viewpoint synthesis prediction section 3094 and derives the predicted image predSamples in a case where the VSP mode flag VspModeFlag is 1. The inter-predicted image generation section 309 causes the motion disparity compensation section 3091 to derive the predicted image predSample using the prediction parameter in a case where the VSP mode flag VspModeFlag is 0. In a case where the residual prediction flag iv_res_pred_weight_idx is not 0, the inter-predicted image generation section 309 sets 1 indicating execution of the residual prediction in a residual prediction execution flag resPredFlag and outputs the residual prediction execution flag resPredFlag to the motion disparity compensation section 3091 and the residual prediction section 3092. Conversely, in a case where the residual prediction flag iv_res_pred_weight_idx is 0, the inter-predicted image generation section 309 sets 0 in the residual prediction flag resPredFlag and outputs the residual prediction flag resPredFlag to the motion disparity compensation section 3091 and the residual prediction section 3092.

(Motion Disparity Compensation)

The motion disparity compensation section 3091 generates a motion predicted image (predicted image) based on the prediction list use flag predFlagLX, the reference picture index refIdxLX, and the vector mvLX (the motion vector or the disparity vector). The motion disparity compensation section 3091 generates the predicted image by reading and compensating a block located at a position deviated by the vector mvLX from the reference picture memory 306 when the position of the prediction unit of the reference picture designated by the reference picture index refIdxLX is a starting point. Here, in a case where the vector mvLX is not an integer vector, a filter generating a pixel at a decimal position referred to as a motion compensation filter (or a disparity compensation filter) is applied to generate the predicted image. In general, in a case where the vector mvLX is a motion vector, the foregoing process is referred to as motion compensation. In a case where the vector mvLX is a disparity vector, the foregoing process is referred to as disparity compensation. Hereinafter, the foregoing process is collectively expressed as motion disparity compensation. Hereinafter, a predicted image of L0 prediction is referred to as predSamplesL0 and a predicted image of L1 prediction is referred to as predSamplesL1. In a case where both of the predicted images are not distinguished from each other, the predicted images are referred to as predSamplesLX. Hereinafter, an example in which residual prediction and illuminance compensation are further executed on the predicted image predSamplesLX obtained by the motion disparity compensation section 3091 will be described. However, such an output image is also referred to as the predicted image predSamplesLX. In the following residual prediction and illuminance compensation, an input image is expressed as predSamplesLX and an output image is expressed as predSamplesLX' in a case where the input image and the output image are distinguished from each other.

In a case where the residual prediction execution flag resPredFlag is 0, the motion disparity compensation section 3091 generates a motion compensated image predSamplesLX by a motion compensation filter in which luminance components are 8 taps and chroma components are 4 taps. In a case where the residual prediction execute flag resPredFlag is 1, the motion disparity compensation section 3091 generates a motion compensated image predSamplesLX by a motion compensation filter in which both of luminance components and chroma components are 2 taps.

(Residual Prediction)

The residual prediction section 3092 executes residual prediction in the case where the residual prediction execute flag resPredFlag is 1. The residual prediction section 3092 outputs the input predicted image predSamplesLX without change in case where the residual prediction execute flag resPredFlag is 0. The refResSamples residual prediction is executed by estimating residual of the motion compensated image predSampleLX generated through the motion prediction or the disparity prediction and applying the residual to the predicted image predSamplesLX of a target layer. Specifically, in a case where the prediction unit is motion prediction, the residual of the already derived reference layer is used as an estimation value of the residual of the target layer on the assumption that the same residual as the reference layer also occurs in the target layer. In a case where the prediction unit is the disparity prediction, a residual between the picture of the target layer and the picture of the reference layer at a different time (POC) from the target picture is used as an estimation value of the residual.

Figure 14:
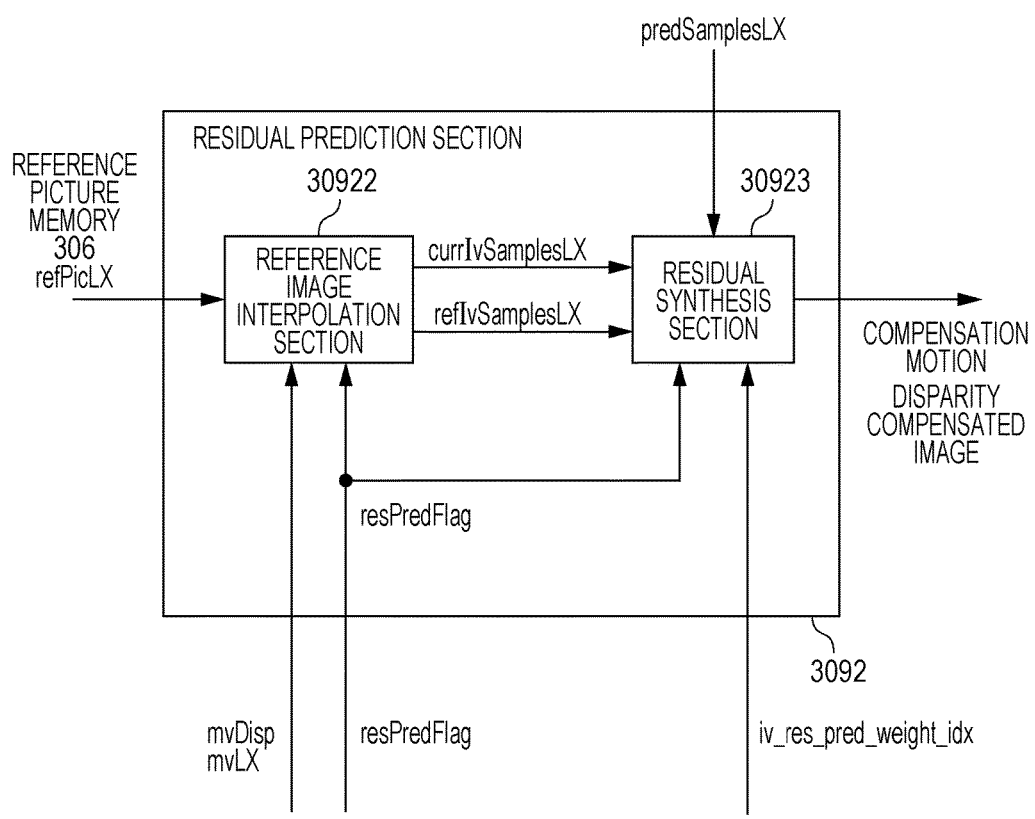
FIG. 14 is a schematic diagram illustrating the configuration of a residual prediction section according to the embodiment.

FIG. 14 is a block diagram illustrating the configuration of the residual prediction section 3092. The residual prediction section 3092 is configured to include a reference image interpolation section 30922 and a residual synthesis section 30923.

In a case where the residual prediction execution flag resPredFlag is 1, the reference image interpolation section 30922 generates two residual prediction motion compensated images (a correspondence block currIvSamplesLX and a reference block refIvSamplesLX) using the vector mvLX and the residual prediction disparity vector mvDisp input from the inter-prediction parameter decoding section 303 and the reference picture stored in the reference picture memory 306.

Figure 15:
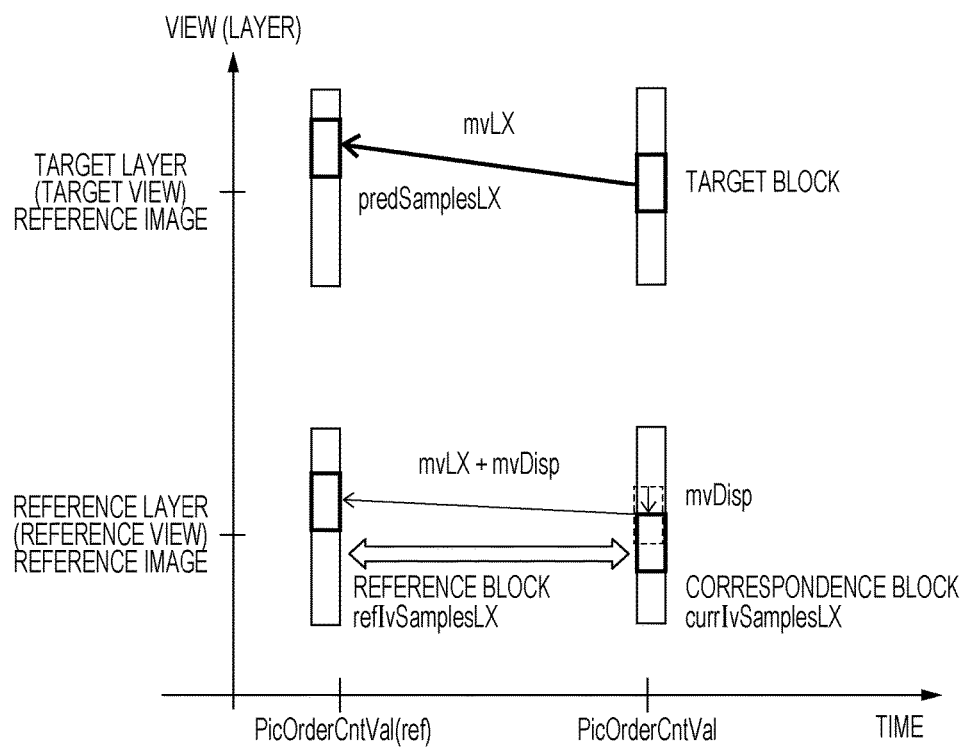
FIG. 15 is a conceptual diagram (part 1) illustrating residual prediction according to the embodiment.

FIG. 15 is a diagram illustrating the correspondence block currIvSamplesLX and the reference block refIvSamplesLX in a case where the vector mvLX is a motion vector. As illustrated in FIG. 15, the correspondence block corresponding to the prediction unit on the target layer is located in a block located at a position deviated by the disparity vector mvDisp which is a vector indicating a positional relation between the reference layer and the target layer when the position of the prediction unit of an image on the reference layer is a starting point. Accordingly, a vector mvC of the correspondence block currIvSamplesLX is derived with the disparity vector mvDisp using the following formulae.

$mvC[0]=mvDisp[0]$ $mvC[1]=mvDisp[1]$

The reference block refIvSamplesLX corresponding to the correspondence block on the reference layer is located in a block located at a position deviated by the motion vector mvLX of the prediction unit when the position of the correspondence block of the reference image on the reference layer is a starting point. Accordingly, the vector mvR of the reference block refIvSamplesLX is derived with the disparity vector mvDisp using the following formulae.

$mvR[0]=mvLX[0]+mvDisp[0]$ $mvR[1]=mvLX[1]+mvDisp[1]$

Figure 16:
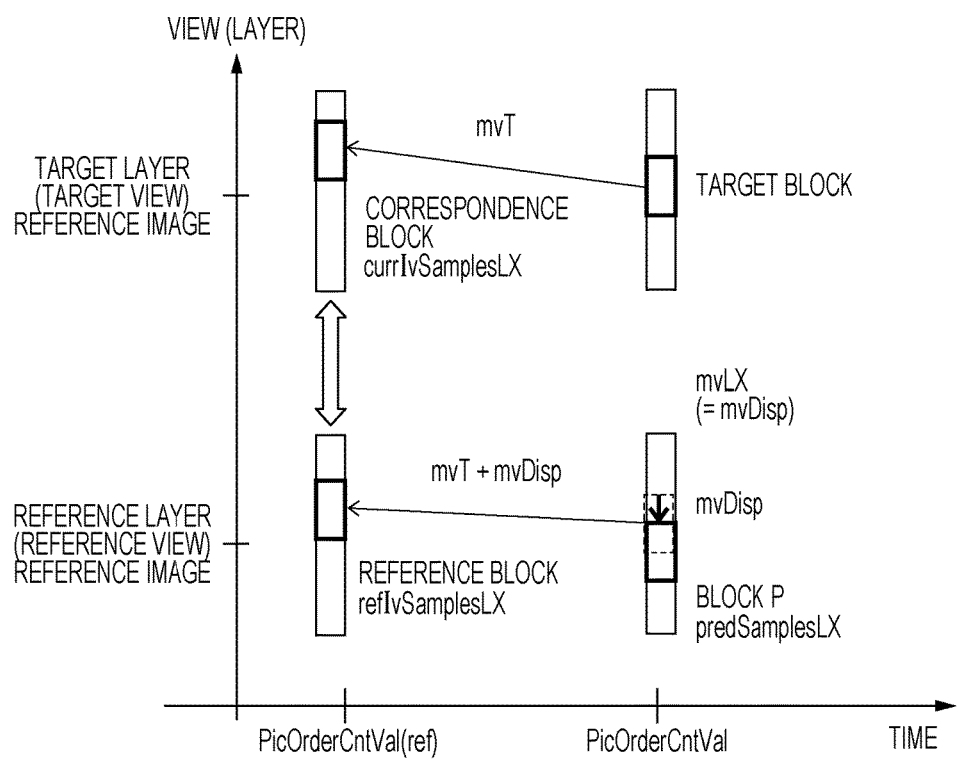
FIG. 16 is a conceptual diagram (part 2) illustrating residual prediction according to the embodiment.

FIG. 16 is a diagram illustrating the correspondence block currIvSamplesLX and the reference block refIvSamplesLX in a case where the vector mvLX is a disparity vector. As illustrated in FIG. 16, the correspondence block currIvSamplesLX is a block on the reference image on the target layer located at a different time from the target picture. When the disparity vector is mvDisp and the motion vector is mvRef, the correspondence block currIvSamplesLX is located in a block located at a position deviated by a vector mvT which is a vector indicating a positional relation between the reference layer and the target layer when the position of the prediction unit is a starting point. Accordingly, the vector mvC of the correspondence block currIvSamplesLX is derived with the disparity vector mvDisp using the following formulae.

$mvC[0]=mvT[0]$ $mvC[1]=mvT[1]$

As illustrated in FIG. 16, the reference block refIvSamplesLX is a block on the reference image on the reference layer located at a different time from the target picture. When the disparity vector is mvDisp and the motion vector is mvT, the reference block refIvSamplesLX is located in a block located at a position deviated by a vector mvRef-mvLX which is a vector indicating a positional relation between the reference layer and the target layer when the position of the prediction unit is a starting point. Accordingly, the vector mvR of the reference block refIvSamplesLX is derived with the disparity vector mvDisp using the following formulae.

$mvR[0]=mvT[0]+mvDisp[0]$ $mvR[1]=mvT[1]+mvDisp[1]$

For the motion vector mvT, a vector of a picture (in the drawing, the block P corresponding to predSamplesLX) on the reference layer at the same time as the target picture is used. For example, in a case where top left coordinates of a block are (xP, yP) and the disparity vector is mvLX[ ], a motion vector of the corresponding position (xRef, yRef) is referred to.

$xRef=Clip3(0,PicWidthInSamplesL-1,xP+(nPSW>>1)+((mvLX[0]+2)>>2))$ $yRef=Clip3(0,PicHeightInSamplesL-1,yP+(nPSH>>1)+((mvLX[1]+2)>>2))$ The reference image interpolation section 30922 sets the vector mvC in the vector mvLX and generate the compensated image of the reference block currIvSamplesLX. A pixel located at a position deviated by the vector mvLX of the prediction unit from the coordinates (x, y) of the pixel of the interpolated image is derived through linear interpolation (bilinear interpolation). Considering that the disparity vector LX has quarter-pel decimal precision, the reference image interpolation section 30922 derives an X coordinate xInt and a Y coordinate yInt of a pixel R0 with corresponding integer precision and a decimal part xFrac of the X component and a decimal part yFrac of the Y component of the disparity vector mvDisp in a case where the coordinates of the pixel of the prediction unit are (xP, yP):

$xInt=xPb+(mvLX[0]>>2)$ $yInt=yPb+(mvLX[1]>>2)$ $xFrac=mvLX[0] \& 3$ $yFrac=mvLX[1] \& 3$. Here, X & 3 is a mathematical formula that extracts only 2 lower bits of X.

Next, the reference image interpolation section 30922 generates an interpolated pixel predPartLX[x][y] in consideration of the fact that the vector mvLX has the quarter-pel decimal precision. First, the coordinates of integer pixels A(xA, yB), B(xB, yB), C(xC, yC), and D(xD, yD) are derived by the following formulae:

$xA=Clip3(0,picWidthInSamples-1,xInt),$ $xB=Clip3(0,picWidthInSamples-1,xInt+1),$ xC=Clip3(0,picWidthInSamples−1,xInt), xD=Clip3(0,picWidthInSamples−1,xInt+1), yA=Clip3(0,picHeightInSamples−1,yInt), yB=Clip3(0,picHeightInSamples−1,yInt), yC=Clip3(0,picHeightInSamples−1,yInt+1), and yD=Clip3(0,picHeightInSamples−1,yInt+1).

Here, the integer pixel A is a pixel corresponding to the pixel R0, and the integer pixels B, C, and D are pixels which have integer precision and are adjacent to the top, bottom, and bottom right of the integer pixel A, respectively. The reference image interpolation section 30922 reads reference pixels refPicLX[xA][yA], refPicLX[xB][yB], refPicLX[xC][yC], and refPicLX[xD][yD] corresponding to the integer pixels A, B, C, and D, respectively, from the reference picture memory 306.

The reference image interpolation section 30922 derives interpolated pixels predPartLX[x][y] which are pixels at positions deviated by the decimal part of the vector mvLX from the pixel R0 through linear interpolation (bilinear interpolation) using the reference pixels refPicLX[xA][yA], refPicLX[xB][yB], refPicLX[xC][yC], and refPicLX[xD][yD] and the decimal part xFrac of the X component and the decimal part yFrac of the Y component of the vector mvLX. Specifically, the derivation is executed by the following formula:

predPart*LX*[x][y]=(refPic*LX*[xA][yA]*(8−xFrac)*(8−yFrac)+refPic*LX*[xB][yB]*(8−yFrac)*xFrac+refPic*LX*[xC][yC]*(8−xFrac)*yFrac+refPic*LX*[xD][yD]*xFrac*yFrac)>>6.

The interpolated pixel has been derived above by bilinear interpolation of one step using the four pixels around the target pixel. However, linear interpolation in the horizontal direction and linear interpolation in the vertical direction may be separated and the residual prediction interpolation image may be generated through the linear interpolation of two steps.

The reference image interpolation section 30922 executes the foregoing interpolated pixel derivation process on each pixel in the prediction unit and sets a set of the interpolated pixels as an interpolated block predPartLX. The reference image interpolation section 30922 outputs the derived interpolated block predPartLX as the correspondence block currIvSamplesLX to the residual synthesis section 30923.

The reference image interpolation section 30922 executes the same process as the process of deriving the correspondence block currIvSamplesLX, excluding the fact that the disparity vector mvLX is substituted with the vector mvR, to derive the reference block refIvSamplesLX. The reference image interpolation section 30922 outputs the reference block refIvSamplesLX to the residual synthesis section 30923.

In the case where the residual prediction execution flag resPredFlag is 1, the residual synthesis section 30923 derives a predicted image by deriving a residual from a difference between two residual prediction motion compensated images (currIvSamplesLX and refIvSamplesLX) and adding the residual to the motion compensated image. Specifically, the residual synthesis section 30923 derives a compensated predicted image predSamplesLX' from the predicted image predSamplesLX, the correspondence block currIvSamplesLX, the reference block refIvSamples, and the residual prediction flag iv_res_pred_weight_idx. The compensated predicted image predSamplesLX' is obtained using the following formula:

predSample*LX*'[x][y]=predSamples*LX*[x][y]+((currIvSamples*LX*[x][y]−refIvSamples*LX*[x][y]>>(iv_res_pred_weight_*idx*−1)).

Here, x is the width of the prediction block−1 from 0 and y is the height of the prediction block−1 from 0. In the case where the residual prediction execution flag resPredFlag is 0, the residual synthesis section 30923 outputs the predicted image predSamplesLX without change as in the following formula.

predSample*LX*'[x][y]=predSamples*LX*[x][y]

(Illuminance Compensation)

In the case where the illuminance compensation flag ic_flag is 1, the illuminance compensation section 3093 executes illuminance compensation on the input predicted image predSamplesLX. In the case where the illuminance compensation flag ic_flag is 0, the input predicted image predSamplesLX is output without change.

(Viewpoint Synthesis Prediction)

In the case where the VSP mode flag VspModeFlag is 1, the viewpoint synthesis prediction section 3094 derives the predicted image predSampleLX through the viewpoint synthesis prediction. The viewpoint synthesis prediction is a process of splitting the prediction unit into sub-blocks and generating the predicted image predSamples by reading and interpolating a block located at a position deviated by a disparity array disparitySampleArray in a sub-block unit from the reference picture memory 306.

Figure 17:
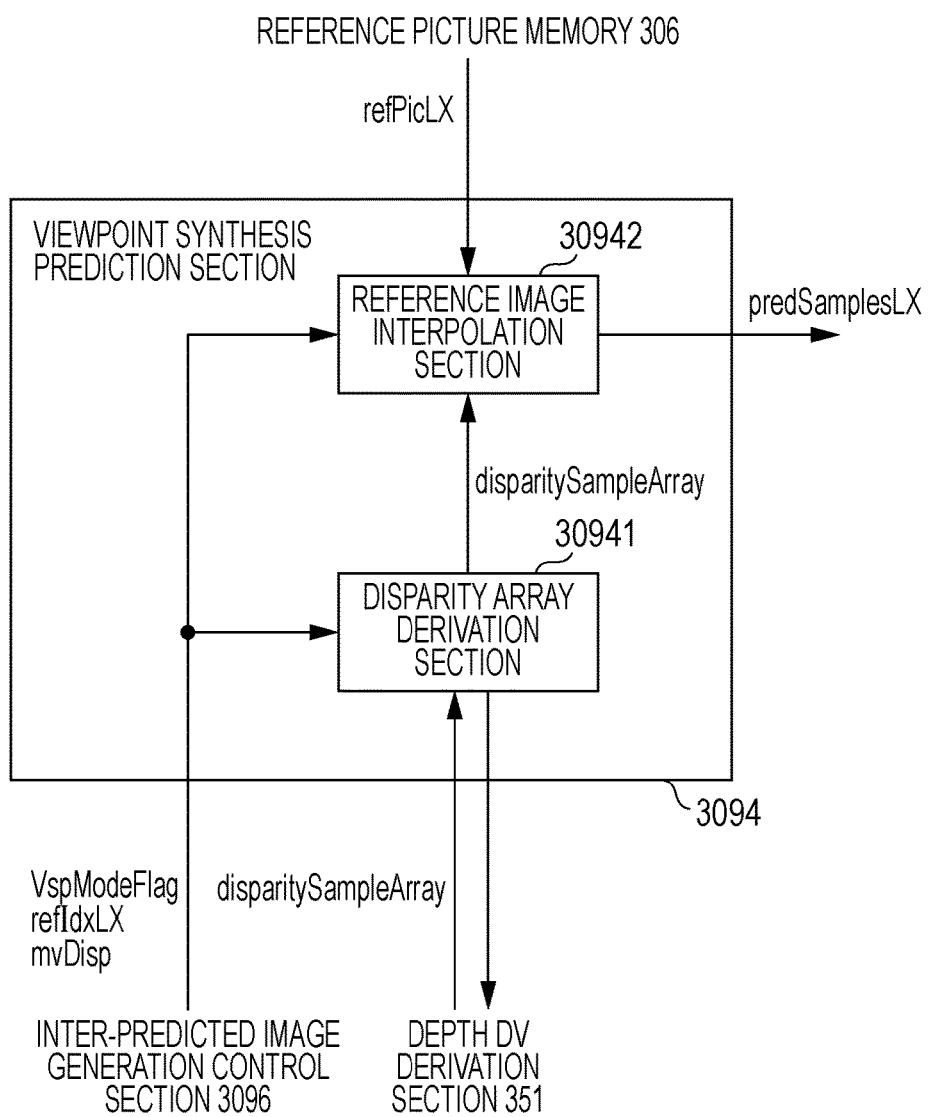
FIG. 17 is a schematic diagram illustrating the configuration of a viewpoint synthesis prediction section according to the embodiment.

FIG. 17 is a block diagram illustrating the configuration of the viewpoint synthesis prediction section 3094. The viewpoint synthesis prediction section 3094 is configured to include a disparity array derivation section 30941 and a reference image interpolation section 30942.

In the case where the VSP mode flag VspModeFlag is 1, the disparity array derivation section 30941 derives the disparity array disparitySampleArray in the sub-block unit.

Specifically, first, the disparity array derivation section 30941 reads a depth image refDepPels which has the same POC as the decoding target picture and the same view ID as the view ID (RefViewIdx) of a picture indicated by the disparity vector from the reference picture memory 306.

Next, the disparity array derivation section 30941 derives coordinates (xTL, yTL) deviated by the disparity vector MvDisp from the top left coordinates (xP, yP) of the prediction unit by the following formulae:

x*TL*=xP+((mvDisp[0]+2)>>2), and y*TL*=yP+((mvDisp[1]+2)>>2).

Here, mvDisp[0] and mvDisp[1] are the X and Y components of the disparity vector MvDisp. The derived coordinates (xTL, yTL) are the coordinates of a block corresponding to the prediction unit on the depth image refDepPels.

The viewpoint synthesis prediction section 3094 executes sub-block splitting according to the size (width nPSW× height nPSH) of a target block (the prediction unit).

FIG. 12 is a diagram illustrating the sub-block splitting on the prediction unit. The prediction unit is split into 8×4 or 4×8 sub-blocks. As illustrated in FIG. 12(*a*), the 8×4 sub-blocks are used in a case where the height nPSH of the prediction unit satisfies nPSH % 8!=0. As illustrated in FIG. 12(*b*), the 4×8 sub-blocks are used in a case where the width nPSW of the prediction unit satisfies nPSW % 8 !=0. As illustrated in FIG. 12(c), the 8×4 or 4×8 sub-blocks are used according to the value of the depth of a depth block corresponding to the prediction unit in other cases.

In a case where the width nPSW or the height nPSH of the prediction unit is not a multiple of 8, the disparity array derivation section 30941 sets a flag minSubBlkSizeFlag to 1 by the following formula:

minSubBlkSizeFlag=(nPSW % 8!=0)||(nPSH % 8!=0).

In a case where the flag minSubBlkSizeFlag is 1 and a case where the height of the prediction unit is not a multiple of 8 (a case where nPSH % 8 is true), the disparity array derivation section 30941 sets horSplitFlag to 1 by the following formula. In other cases, 0 is set.

horSplitFlag=(nPSH % 8!=0)

That is, the case where the height of the prediction unit is not a multiple of 8 (a case where nPSH % 8 is true), 1 is set in horSplitFlag. In a case where the width of the prediction unit is not a multiple of 8 (a case where nPSW % 8 is true), 0 is set in horSplitFlag.

Figure 13:
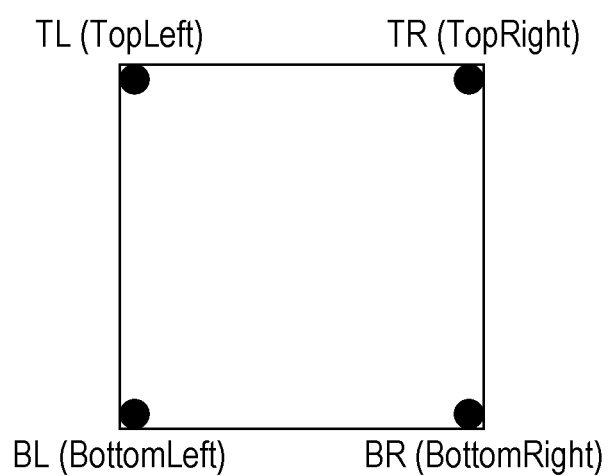
FIG. 13 is a diagram illustrating a sub-block splitting method in the viewpoint synthesis section.

In a case where the flag minSubBlkSizeFlag is 0, the disparity array derivation section 30941 derives the size of the sub-block from the depth value. FIG. 13 is a diagram illustrating a method of deriving the size of the sub-block from the depth value. As illustrated in FIG. 13, the size of the sub-block is derived by comparing 4 corner blocks (TL, TR, BL, and BR) of the prediction block. Specifically, in a case where a pixel value of a depth image at the coordinates of the top left (TL) of the prediction unit is refDepPelsP0, a pixel value of the top right (TR) is refDepPelsP1, a pixel value of the bottom left (BL) is refDepPelsP2, and a pixel value of the bottom right (BR) is refDepPelsP3, it is determined whether a conditional formula (horSplitFlag) of hor-SplitFlag=(refDepPelsP0>refDepPelsP3)== (refDepPelsP1>refDepPelsP2) is satisfied. In the derivation of horSplitFlag, the following formula in which symbols are changed may be used.

horSplitFlag=(refDepPelsP0<refDepPelsP3)== (refDepPelsP1<refDepPelsP2)

Next, the disparity array derivation section 30941 sets a width nSubBlkW and a height nSubBlkH of the sub-block using the following formulae:

nSubBlkW=horSplitFlag? 8: 4, and nSubBlkH=horSplitFlag? 4: 8.

The foregoing operation of the disparity array derivation section 30941 is equivalent to the followings. In the case where the height nPSH of the prediction unit is not a multiple of 8 (the case where nPSH % 8 is true), 8 is set in the width nSubBlkW of the sub-block and 4 is set in the width nSubBlkH of the sub-block, as in the following formulae:

nSubBlkW=8, and nSubBlkH=4.

In another case where the width nPSW of the prediction unit is not a multiple of 8 (the case where nPSW % 8 is true), 4 is set in the width nSubBlkW of the sub-block and 8 is set in the width nSubBlkH of the sub-block, as in the following formulae:

nSubBlkW=4, and nSubBlkH=8.

In other cases (a case where both of the height and the width of the prediction unit are a multiple of 8), the disparity array derivation section 30941 sets the width and the height of the sub-block using the pixel value of the depth image using the foregoing conditional formula.

Next, the disparity array derivation section 30941 obtains a disparity array disparitySampleArray from the depth DV derivation section 351 by outputting the width nSubBlkW and the height nSubBlkH of the sub-block in a case where the top left pixel of the block is set as the origin for each of the sub-blocks in the prediction unit, a splitting flag split-Flag, a depth image refDepPels, the coordinates (xTL, yTL) of the correspondence block, and the view IDrefViewIdx of the layer to which the reference picture indicated by the reference picture index refIdxLX belongs to the depth DV derivation section 351. The disparity array derivation section 30941 outputs the derived disparity array disparityS-tampleArray to the reference image interpolation section 30922.

(Depth DV Derivation Section 351)

The depth DV derivation section 351 receives the depth DV conversion table DepthtoDisparityB, the width nSub-BlkW and the height nSubBlkH of the sub-block, the splitting flag splitFlag, the depth image refDepPels, the coordinates (xTL, yTL) of the correspondence block on the depth image refDepPels, and the view IDrefViewIdx as inputs and derives the disparity array disparitySamples which is the horizontal component of a depth-originated disparity vector through the following process.

The depth DV derivation section 351 derives a representative value maxDep of a depth for each sub-block included in the prediction unit.

In a case where relative coordinates (xSubB, ySubB) from the top left prediction block (xTL, yTL) of the sub-blocks are (xSubB, ySubB), the depth DV derivation section 351 sets the X coordinate xP0 at the loft end of the sub-block, the X coordinate xP1 at the right end, the Y coordinate yP0 at the top end, and the Y coordinate yP1 at the bottom end using the following formulae:

xP0=Clip3(0,pic_width_in_luma_samples−1,xTL+ xSubB), yP0=Clip3(0,pic_height_in_luma_samples−1,yTL+ ySubB), xP1=Clip3(0,pic_width_in_luma_samples−1,xTL+ xSubB+nSubBlkW−1), and yP1=Clip3(0,pic_height_in_luma_samples−1,yTL+ ySubB+nSubBlkH−1).

Here, pic_width_in_luma_samples and pic_height_in_luma_samples indicate the width and the height of each image.

Next, the depth DV derivation section 351 derives the representative value maxDep of the depth of the sub-block. Specifically, the depth DV derivation section 351 derives the representative depth value maxDep which is the maximum value of pixel values refDepPels[xP0][yP0], refDepPels[xP0][yP1], refDepPels[xP1][yP0], and refDepPels[xP1][yP1] of depth images at the corners of the sub-block and 4 points near the corners from the following formulae:

maxDep=0, maxDep=Max(maxDep,refDepPels[xP0][yP0]), maxDep=Max(maxDep,refDepPels[xP0][yP1]), maxDep=Max(maxDep,refDepPels[xP1][yP0]), and maxDep=Max(maxDep,refDepPels[xP1][yP1]).

The function Max (x, y) is a function that returns x in a case where a first argument x is equal to or greater than a second argument y and returns y otherwise.

The depth DV derivation section 351 derives a disparity array disparitySamples which is the horizontal component of the depth-originated disparity vector for each pixel (x, y) (where x receives a value of nSubBlkW−1 from 0 and y receives a value of nSubBlkH−1 from 0) in the sub-block using the representative depth value maxDep, the depth DV conversion table DepthToDisparityB, and the view IDrefViewIdx of the layer indicated by the disparity vector (NBDV) by the following formula:

disparitySamples[$x$][$y$]=DepthToDisparityB
 [refViewIdx][max$Dep$]    (formula A).

The depth DV derivation section 351 outputs the derived disparity array disparitySamples as DoNBDV to the disparity vector derivation section 30363. The depth DV derivation section 351 outputs the derived disparity array disparitySamples as the disparity vector of the sub-block to the reference image interpolation section 30942.

The reference image interpolation section 30942 derives a prediction block predSamples from the disparity array disparitySampleArray input from the disparity array derivation section 30941 and the reference picture index refIdxLX input from the inter-prediction parameter decoding section 303.

The reference image interpolation section 30942 extracts a pixel located at a position of which the X coordinate is deviated by the value of the corresponding disparity array disparitySampleArray from the coordinates of the pixel from the reference picture refPic designated by the reference picture index refIdxLX for each pixel in the prediction unit. In a case where the coordinates of the pixel at the top left end of the prediction unit are (xP, yP) and the coordinates of each pixel in the prediction unit are (xL, yL) (where xL receives a value of nPbW−1 from 0 and yL receives a value of nPbH−1 from 0), the reference image interpolation section 30942 derives the coordinates (xInt, yInt) of the integer parts of the pixel extracted from the reference picture refPic and the decimal parts xFrac and yFrac of the disparity array disparitySampleArray [xL][yL] corresponding to the pixel (xL, yL) by the following formulae in consideration of the fact that the disparity array disparitySampleArray has the quarter-pel decimal precision:

$x$Int$L$=$xP$+$xL$+disparitySamples[$xL$][$yL$],$y$Int$L$=$yP$+ $yL$, $x$Frac$L$=disparitySamples[$xL$][$yL$] & 3, and
 $x$Frac$L$=0.

Next, the reference image interpolation section 30942 performs the same interpolated pixel derivation process as the motion disparity compensation section 3091 on each sub-block of the prediction unit and sets a set of the interpolated pixels as the interpolated block predPartLX. The reference image interpolation section 30942 outputs the derived interpolated block predPartLX as the predicted block predSamplesLX to the addition section 312.
(Configuration of Image Coding Device)

Figure 20:
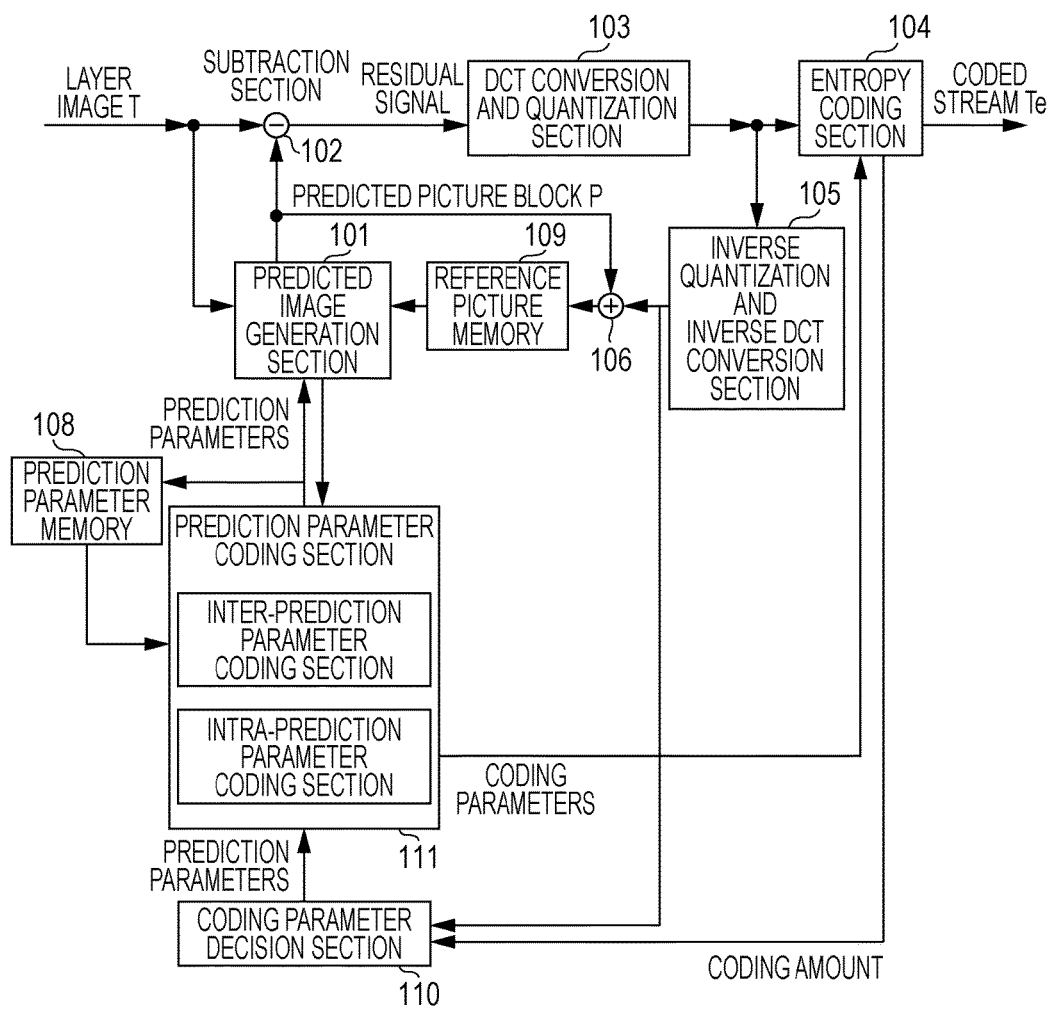
FIG. 20 is a block diagram illustrating the configuration of an image coding device according to the embodiment.

Next, the configuration of the image coding device 11 according to the embodiment will be described. FIG. 20 is a block diagram illustrating the configuration of an image coding device 11 according to the embodiment. The image coding device 11 is configured to include a predicted image generation section 101, a subtraction section 102, a DCT and quantization section 103, an entropy coding section 104, an inverse quantization and inverse DCT section 105, an addition section 106, a prediction parameter memory (a prediction parameter storage section or a frame memory) 108, a reference picture memory (a reference image storage section or a frame memory) 109, a coding parameter decision section 110, and a prediction parameter coding section 111. The prediction parameter coding section 111 is configured to include an inter-prediction parameter coding section 112 and an intra-prediction parameter coding section 113. The image coding device 11 is an image coding device that codes coded data which is formed by a plurality of viewpoint images and depth images and is formed by a base layer and enhancement layers.

The predicted image generation section 101 generates the predicted picture block predSamples for each block which is a region separated from each picture in regard to the picture at each viewpoint of the layer image T input from the outside. Here, the predicted image generation section 101 reads the reference picture block from the reference picture memory 109 based on the prediction parameter input from the prediction parameter coding section 111. The prediction parameter input from the prediction parameter coding section 111 is, for example, the motion vector or the disparity vector. The predicted image generation section 101 reads the reference picture block of the block located at a position indicated by the motion vector or the disparity vector predicated using a coding prediction unit as a starting point. The predicted image generation section 101 generates the predicted picture block predSamples using one prediction scheme among a plurality of prediction schemes in regard to the read reference picture block. The predicted image generation section 101 outputs the generated predicted picture block predSamples to the subtraction section 102 and the addition section 106. Since the operation of the predicted image generation section 101 is the same as the operation of the predicted image generation section 308 described above, the details of the generation of the predicted picture block predSamples will be omitted.

To select the prediction scheme, the predicted image generation section 101 selects, for example, a prediction scheme in which an error value based on a difference between a signal value for each pixel of the block included in the layer image and a signal value for each pixel corresponding to the predicted picture block predSamples is the minimum. The method of selecting the prediction scheme is not limited thereto.

When a coding target picture is a base view picture, the plurality of prediction schemes are intra-prediction, motion prediction, and merge prediction. The motion prediction is display inter-temporal prediction among the above-described inter-prediction. The merge prediction is prediction in which the same reference picture block as a block which is the already coded block and is a block within a pre-decided range from the prediction unit and the prediction parameters are used. In a case where the coding target picture is a picture other than the base view picture, the plurality of prediction schemes are intra-prediction, motion prediction, a merge mode (including viewpoint synthesis prediction), and disparity prediction. The disparity prediction (parallax prediction) is prediction between different layer images (different viewpoint images) in the above-described inter-prediction. In the disparity prediction (parallax prediction), there are prediction in a case where the additional prediction (the residual prediction and the illuminance compensation) is executed and prediction when the additional prediction is not executed.

In a case where the intra-prediction is selected, the predicted image generation section 101 outputs the prediction mode predMode indicating the intra-prediction mode used at the time of the generation of the predicted picture block predSamples to the prediction parameter coding section 111.

In a case where the motion prediction is selected, the predicted image generation section 101 stores the motion vector mvLX used at the time of the generation of the predicted picture block predSamples in the prediction parameter memory 108 and outputs the motion vector mvLX to the inter-prediction parameter coding section 112. The motion vector mvLX indicates a vector from the position of the coding prediction unit to the position of the reference picture block at the time of the generation of the predicted picture block predSamples. Information indicating the motion vector mvLX includes information (for example, the reference picture index refIdxLX or the picture order count POC) indicating the reference picture and may indicate the prediction parameter. The predicted image generation section 101 outputs a prediction mode PredMode indicating the inter-prediction mode to the prediction parameter coding section 111.

In a case where the disparity prediction is selected, the predicted image generation section 101 stores the disparity vector used at the time of the generation of the predicted picture block predSamples in the prediction parameter memory 108 and outputs the disparity vector to the inter-prediction parameter coding section 112. The disparity vector dvLX indicates a vector from the position of the coding prediction unit to the position of the reference picture block at the time of the generation of the predicted picture block predSamples. Information indicating the disparity vector dvLX includes information (for example, the reference picture index refIdxLX or the view ID view_id) indicating the reference picture and may indicate the prediction parameter. The predicted image generation section 101 outputs a prediction mode predMode indicating the inter-prediction mode to the prediction parameter coding section 111.

In a case where the merge mode is selected, the predicted image generation section 101 outputs the merge index merge_idx indicating the selected reference picture block to the inter-prediction parameter coding section 112. Further, the predicted image generation section 101 outputs a prediction mode predMode indicating the merge mode to the prediction parameter coding section 111.

In a case where the VSP mode flag VspModeFlag indicates that the predicted image generation section 101 executes the viewpoint synthesis prediction in the merge mode described above, the viewpoint synthesis prediction section 3094 included in the predicted image generation section 101, as described above, executes the viewpoint synthesis prediction. In a case where the residual prediction execution flag resPredFlag indicates that the predicted image generation section 101 executes the residual prediction, the residual prediction section 3092 included in the predicted image generation section 101, as described above, executes the residual prediction.

The subtraction section 102 generates a residual signal by subtracting a signal value of the predicted picture block predSamples input from the predicted image generation section 101 for each pixel from a signal value of the block corresponding to the layer image T input from the outside. The subtraction section 102 outputs the generated residual signal to the DCT and quantization section 103 and the coding parameter decision section 110.

The DCT and quantization section 103 executes DCT on the residual signal input from the subtraction section 102 to calculate a DCT coefficient. The DCT and quantization section 103 quantizes the calculated DCT coefficient to obtain a quantization coefficient. The DCT and quantization section 103 outputs the obtained quantization coefficient to the entropy coding section 104 and the inverse quantization and inverse DCT section 105.

The quantization coefficient is input from the DCT and quantization section 103 to the entropy coding section 104 and the coding parameters are input from the coding parameter decision section 110 to the entropy coding section 104. As the input coding parameters, for example, there are codes such as the reference picture index refIdxLX, the prediction vector flag mvp_LX_flag, the difference vector mvdLX, the prediction mode PredMode, the merge index merge_idx, the residual prediction weight index iv_res_pred_weight_idx, and the illumination compensation flag ic_flag.

The entropy coding section 104 executes entropy coding on the input quantization coefficient and coding parameters to generate the coded stream Te and outputs the generated coded stream Te to the outside.

The inverse quantization and inverse DCT section 105 executes inverse quantization on the quantization coefficient input from the DCT and quantization section 103 to obtain a DCT coefficient. The inverse quantization and inverse DCT section 105 executes the inverse DCT on the obtained DCT coefficient to calculate a decoding residual signal. The inverse quantization and inverse DCT section 105 outputs the calculated decoding residual signal to the addition section 106 and the coding parameter decision section 110.

The addition section 106 adds a signal value of the predicted picture block predSamples input from the predicted image generation section 101 and a signal value of the decoding residual signal input from the inverse quantization and inverse DCT section 105 for each pixel to generate a reference picture block. The addition section 106 stores the generated reference picture block in the reference picture memory 109.

The prediction parameter memory 108 stores the prediction parameter generated by the prediction parameter coding section 111 at a position decided in advance for each coding target picture and block.

The reference picture memory 109 stores the reference picture block generated by the addition section 106 at a position decided in advance for each coding target picture and block.

The coding parameter decision section 110 selects one set from a plurality of sets of coding parameters. The coding parameters are the above-described prediction parameters or parameters which are coding targets generated in association with the prediction parameters. The predicted image generation section 101 generates the predicted picture block predSamples using each set of coding parameters.

The coding parameter decision section 110 calculates a cost value indicating the size of an information amount or a coding error in each of the plurality of sets. The cost value is, for example, a sum of the coding amount and a value obtained by multiplying a squared error by a coefficient $\lambda$. The coding amount is an information amount of the coded stream Te obtained by executing the entropy coding on a quantized error and the coding parameter. The squared error is a total sum of squared values of residual values of residual signals calculated in the subtraction section 102 between the pixels. The coefficient $\lambda$ is a larger real number than preset zero. The coding parameter decision section 110 selects the set of coding parameters for which the calculated cost value is the minimum. In this way, the entropy coding section 104 outputs the selected set of coding parameters as the coded stream Te to the outside and does not output the unselected set of coding parameters.

The prediction parameter coding section 111 derives the prediction parameters used at the time of the generation of the predicted picture based on the parameter input from the predicted image generation section 101 and codes the derived prediction parameter to generate the set of coding parameters. The prediction parameter coding section 111 outputs the generated set of coding parameters to the entropy coding section 104.

The prediction parameter coding section 111 stores the prediction parameter corresponding to the set of coding parameters selected by the coding parameter decision section 110 among the generated sets of coding parameters in the prediction parameter memory 108.

In a case where the prediction mode PredMode input from the predicted image generation section 101 is the inter-prediction mode, the prediction parameter coding section 111 causes the inter-prediction parameter coding section 112 to operate. In a case where the prediction mode PredMode indicates the intra-prediction mode, the prediction parameter coding section 111 causes the intra-prediction parameter coding section 113 to operate.

The inter-prediction parameter coding section 112 derives the inter-prediction parameter based on the prediction parameter input from the coding parameter decision section 110. The inter-prediction parameter coding section 112 has the same configuration as the configuration in which the inter-prediction parameter decoding section 303 (see FIG. 5 or the like) derives the inter-prediction parameter as the configuration in which the inter-prediction parameter is derived. The configuration of the inter-prediction parameter coding section 112 will be described below.

The intra-prediction parameter coding section 113 decides an intra-prediction mode IntraPredMode indicated by the prediction mode PredMode input from the coding parameter decision section 110 as the set of inter-prediction parameter.

(Configuration of Inter-prediction Parameter Coding Section)

Figure 21:
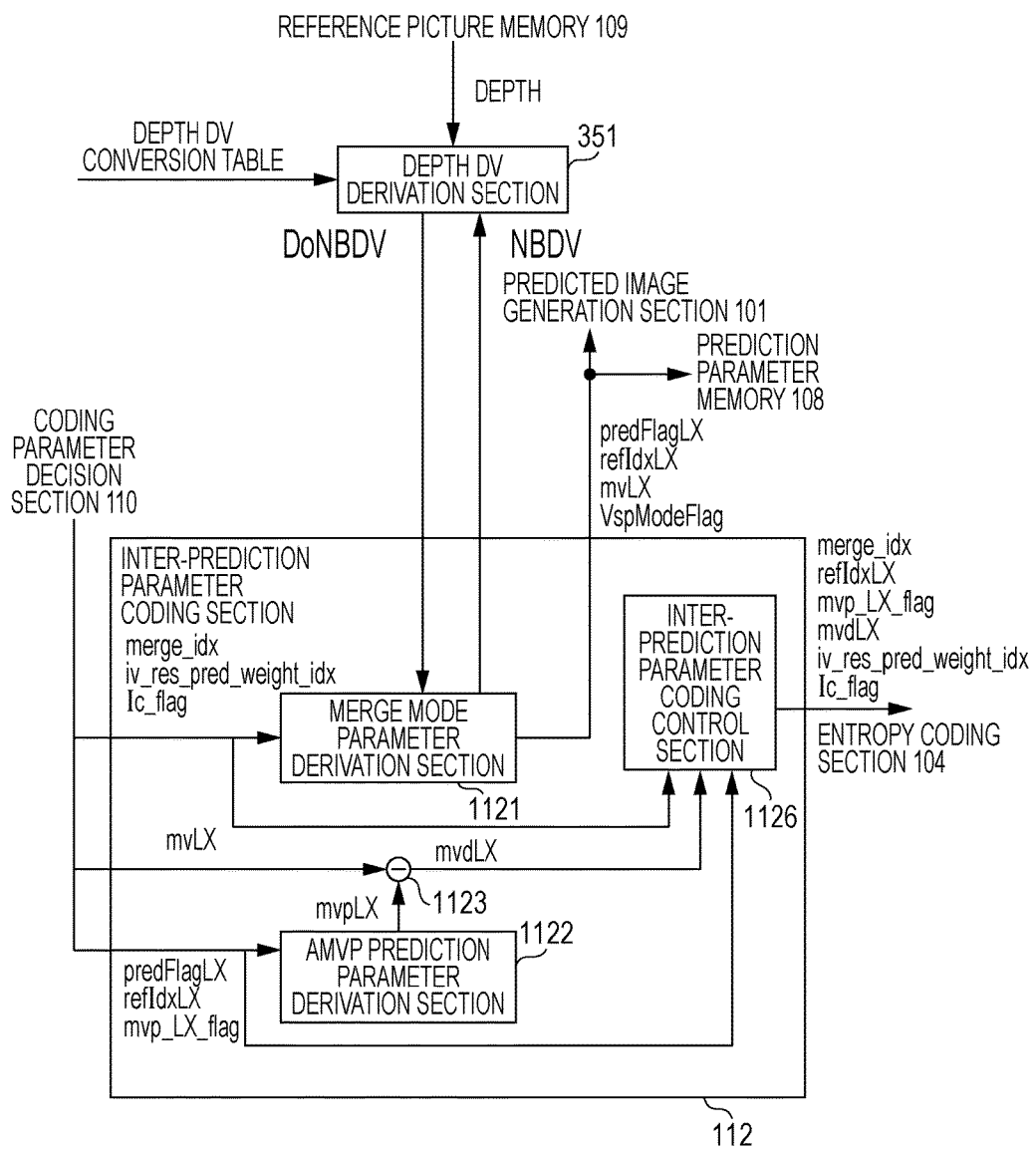
FIG. 21 is a schematic diagram illustrating the configuration of an inter-prediction parameter coding section according to the embodiment.

Next, the configuration of the inter-prediction parameter coding section 112 will be described. The inter-prediction parameter coding section 112 is means corresponding to the inter-prediction parameter decoding section 303. FIG. 21 is a schematic diagram illustrating the configuration of the inter-prediction parameter coding section 112 according to the embodiment. The inter-prediction parameter coding section 112 is configured to include a merge mode parameter derivation section 1121, an AMVP prediction parameter derivation section 1122, a subtraction section 1123, and an inter-prediction parameter coding control section 1126.

The merge mode parameter derivation section 1121 has the same configuration as the above-described merge mode parameter derivation section 3036 (see FIG. 7).

That is, the merge mode parameter derivation section 3036 includes any one of the merge candidate derivation section 30361, the merge candidate derivation section 30361B, and the merge candidate derivation section 30361C described above, and thus does not store the enhancement merge candidate in the merge candidate list in the case where the prediction unit has a size equal to or less than the predetermined size.

In the case where the prediction unit has a size equal to or less than the predetermined size, as described above, the merge mode parameter derivation section 3036 does not derive the enhancement merge candidate. Therefore, there is the advantage of easily executing the process of deriving the prediction parameter.

The merge mode parameter derivation section 3036 includes any one of the merge mode parameter derivation section 3036D and the spatial merge candidate derivation section 3036131D, and thus does not succeed the VSP mode flag from the adjacent block in the case where the prediction unit has a size equal to or less than the predetermined size. Since it is not necessary to refer to the VSP mode flag VspModeFlag of the adjacent block, there is the advantage of easily deriving the merge candidate.

The AMVP prediction parameter derivation section 1122 has the same configuration as the above-described AMVP prediction parameter derivation section 3032 (see FIG. 7).

The subtraction section 1123 subtracts the prediction vector mvpLX input from the AMVP prediction parameter derivation section 1122 from the vector mVLX input from the coding parameter decision section 110 to generate the difference vector mvdLX. The difference vector mvdLX is output to the inter-prediction parameter coding control section 1126.

The inter-prediction parameter coding control section 1126 instructs the entropy coding section 104 to code codes (syntax components) related to the inter-prediction and to code codes (the syntax components) included in the coded data, for example, the splitting mode part mode, the merge flag merge_flag, the merge index merge_idx, the inter-prediction flag inter_pred_idc, the reference picture index refIdxLX, the prediction vector flag mvp_LX_flag, and the difference vector mvdLX.

The inter-prediction parameter coding control section 1126 is configured to include an additional prediction flag coding section 10311, a merge index coding section 10312, a vector candidate index coding section 10313 and include a splitting mode coding section, a merge flag coding section, an inter-prediction flag coding section, a reference picture index coding section, and a vector difference coding section (none of which is illustrated). The splitting mode coding section, the merge flag coding section, the merge index coding section, the inter-prediction flag coding section, the reference picture index coding section, the vector candidate index coding section 10313, and the vector difference coding section code the splitting mode part mode, the merge flag merge_flag, the merge index merge_idx, the inter-prediction flag inter_pred_idc, the reference picture index refIdxLX, the prediction vector flag mvp_LX_flag, and the difference vector mvdLX, respectively.

The additional prediction flag coding section 10311 codes the illuminance compensation flag ic_flag and the residual prediction weight index iv_res_pred_weight_idx to indicate whether additional prediction is executed.

In a case where the prediction mode PredMode input from the predicted image generation section 101 is the merge mode, the inter-prediction parameter coding control section 1126 outputs the merge index merge_idx input from the coding parameter decision section 110 to the entropy coding section 104 so that the entropy coding section 104 codes the merge index merge_idx.

The inter-prediction parameter coding control section 1126 executes the following processes in the case where the prediction mode PredMode input from the predicted image generation section 101 is the inter-prediction mode.

The inter-prediction parameter coding control section 1126 unifies the reference picture index refIdxLX and the prediction vector flag mvp_LX_flag input from the coding parameter decision section 110 and the difference vector mvdLX input from the subtraction section 1123. The inter-prediction parameter coding control section 1126 outputs the unified code to the entropy coding section 104 so that the entropy coding section 104 codes the code.

The predicted image generation section 101 is means corresponding to the above-described predicted image generation section 308 and the process of generating the predicted image from the prediction parameters is the same.

A computer may be allowed to realize some of the image coding device 11 and the image decoding device 31 according to the above-described embodiment, for example, the entropy decoding section 301, the prediction parameter decoding section 302, the predicted image generation section 101, the DCT and quantization section 103, the entropy coding section 104, the inverse quantization and inverse DCT section 105, the coding parameter decision section 110, the prediction parameter coding section 111, the entropy decoding section 301, the prediction parameter decoding section 302, the predicted image generation section 308, and the inverse quantization and inverse DCT section 311. In this case, a program realizing the control function may be recorded on a computer-readable recording medium and the program recorded on the recording medium may be read to a computer system to be executed so that the functions are realized. The "computer system" mentioned here is a computer system included in one of the image coding device 11 and the image decoding device 31 and includes an OS and hardware such as peripheral device. The "computer-readable recording medium" refers to a portable medium such as a flexible disk, a magneto-optical disc, a ROM, or a CD-ROM or a storage device such as a hard disk included in a computer system. The "computer-readable recording medium" may also include a medium retaining a program dynamically for a short time, such as a communication line when a program is transmitted via a network such as the Internet or a communication circuit line such as a telephone circuit and a medium retaining a program for a given time, such as a volatile memory included in a computer system serving as a server or a client in this case. The program may be a program used to realize some of the above-described functions or may be a program combined with a program already stored in a computer system to realize the above-described functions.

Some or all of the image coding device 11 and the image decoding device 31 according to the above-described embodiment may be realized as an integrated circuit such as a large scale integration (LSI). Each of the functional blocks of the image coding device 11 and the image decoding device 31 may be individually formed as a processor or some or all of the functional blocks may be integrated to be formed as a processor. A method for an integrated circuit is not limited to the LSI, but may be realized by a dedicated circuit or a general processor. When an integrated circuit technology substituting the LSI with an advance in semiconductor technologies appears, an integrated circuit may be used by the technology.

The embodiment of the invention has been described above in detail with reference to the drawings, but a specific configuration is not limited to the above-described configuration. The invention can be modified in various forms within the scope of the invention without departing from the gist of the invention.

INDUSTRIAL APPLICABILITY

The invention can be appropriately applied to an image decoding device that decodes coded data obtained by coding image data and an image coding device that generates coded data obtained by coding image data. Further, the invention can be appropriately applied to the data structure of coded data generated by an image coding device and referred to by an image decoding device.

REFERENCE SIGNS LIST 1 image transmission system
11 image coding device
101 predicted image generation section
102 subtraction section
103 DCT and quantization section
10311 additional prediction flag coding section
10312 merge index coding section
10313 vector candidate index coding section
104 entropy coding section
105 inverse quantization and inverse DCT section
106 addition section
108 prediction parameter memory (frame memory)
109 reference picture memory (frame memory)
110 coding parameter decision section
111 prediction parameter coding section
112 inter-prediction parameter coding section
1121 merge mode parameter derivation section
1122 AMVP prediction parameter derivation section
1123 subtraction section
1126 inter-prediction parameter coding control section
113 intra-prediction parameter coding section
21 network
31 image decoding device
301 entropy decoding section
302 prediction parameter decoding section
303 inter-prediction parameter decoding section
3031 inter-prediction parameter decoding control section
30311 residual prediction weight index decoding section
3032 AMVP prediction parameter derivation section
3035 addition section
3036 merge mode parameter derivation section
3036D merge mode parameter derivation section
30361 merge candidate derivation section (merge candidate derivation device)
30361B merge candidate derivation section (merge candidate derivation device)
30361C merge candidate derivation section (merge candidate derivation device)
303611 merge candidate storage section
303612 enhancement merge candidate derivation section
3036121 inter-layer merge candidate derivation section
3036123 disparity merge candidate derivation section
3036124 VSP merge candidate derivation section
303613 base merge candidate derivation section
3036131 spatial merge candidate derivation section
3036131D spatial merge candidate derivation section
3036132 temporal merge candidate derivation section
3036133 coupled merge candidate derivation section
3036134 zero merge candidate derivation section
30362 merge candidate selection section
30363 disparity vector derivation section
304 intra-prediction parameter decoding section
306 reference picture memory (frame memory)
307 prediction parameter memory (frame memory)
308 predicted image generation section
309 inter-predicted image generation section
3091 motion disparity compensation section
3092 residual prediction section
30922 reference image interpolation section 30923 residual synthesis section
3093 illuminance compensation section
3094 viewpoint synthesis prediction section
30941 disparity array derivation section
30942 reference image interpolation section
310 intra-predicted image generation section
311 inverse quantization and inverse DCT section
312 addition section
351 depth DV derivation section
41 image display device

The invention claimed is:

1. A video decoding device decoding coded data formed by a plurality of layers, the video decoding device comprising:
   a prediction device that includes at least one circuitry, wherein
   the circuitry
   derives a base merge candidate list and an enhancement merge candidate list including at least one enhancement merge candidates, wherein the enhancement merge candidates include at least an interview merge candidate, a disparity merge candidate, a motion shift merge candidate, and a disparity shift merge candidate;
   derives a prediction parameter by using the base merge candidate list in a case where a sum of a width and a height of a prediction block is equal to 12;
   derives the prediction parameter by using the enhancement merge candidate list in a case where the sum of the width and the height of the prediction block is not equal to 12,
   determines whether or not each of the enhancement merge candidates is stored in the enhancement merge candidate list by using at least one of following flags which are different from each other,
   (i) a flag indicating whether the interview merge candidate is included in the enhancement merge candidate list, (ii) a flag indicating whether the disparity merge candidate is included in the enhancement merge candidate list, (iii) a flag indicating whether the motion shift merge candidate is included in the enhancement merge candidate list, and (iv) a flag indicating whether the disparity shift merge candidate is included in the enhancement merge candidate list; and
   uses the prediction parameter to generate a predicted image.

2. A video coding device coding coded data formed by a plurality of layers, the video coding device comprising:
   a prediction device that includes at least one circuitry, wherein the circuitry
   derives a base merge candidate list and an enhancement merge candidate list including at least one enhancement merge candidates, wherein the enhancement merge candidates include at least an interview merge candidate, a disparity merge candidate, a motion shift merge candidate, and a disparity shift merge candidate;
   derives a prediction parameter by using the base merge candidate list in a case where a sum of a width and a height of a prediction block is equal to 12;
   derives the prediction parameter by using the enhancement merge candidate list, in a case where the sum of the width and the height of the prediction block is not equal to 12;
   determines whether or not each of the enhancement merge candidates is stored in the enhancement merge candidate list by using at least one of following flags which are different from each other,
   (i) a flag indicating whether the interview merge candidate is included in the enhancement merge candidate list, (ii) a flag indicating whether the disparity merge candidate is included in the enhancement merge candidate list, (iii) a flag indicating whether the motion shift merge candidate is included in the enhancement merge candidate list, and (iv) a flag indicating whether the disparity shift merge candidate is included in the enhancement merge candidate list; and
   uses the prediction parameter to generate a predicted image.

* * * * *